US011295525B1

(12) United States Patent
Kelly et al.

(10) Patent No.: US 11,295,525 B1
(45) Date of Patent: Apr. 5, 2022

(54) AUGMENTING TRANSMITTED VIDEO DATA

(71) Applicant: Amazon Technologies, Inc., Seattle, WA (US)

(72) Inventors: Daniel Kelly, Seattle, WA (US); Matthew Brinkley, Portland, OR (US); Ting-Hsiang Hwang, Seattle, WA (US); Amy Bergsieker, Seattle, WA (US); Cameron Charles, Seattle, WA (US); Elliot Chong, Seattle, WA (US); Gonzalo Ramos, Kirkland, WA (US); Babak Amir Parviz, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/171,406

(22) Filed: Feb. 9, 2021

Related U.S. Application Data

(63) Continuation of application No. 15/282,357, filed on Sep. 30, 2016, now Pat. No. 10,950,049, and a continuation of application No. 15/282,389, filed on Sep. 30, 2016, now Pat. No. 10,943,396.

(51) Int. Cl.
*G06T 19/00* (2011.01)
(52) U.S. Cl.
CPC .......... *G06T 19/003* (2013.01); *G06T 19/006* (2013.01)
(58) Field of Classification Search
CPC ............................ G06T 19/003; G06T 19/006
See application file for complete search history.

(56) References Cited

U.S. PATENT DOCUMENTS

| | | | |
|---|---|---|---|
| RE44,925 E | 6/2014 | Vincent | |
| 9,058,764 B1 | 6/2015 | Persson et al. | |
| 9,674,290 B1 | 6/2017 | Rincon et al. | |
| 9,824,490 B1 | 11/2017 | Côté et al. | |
| 10,943,396 B1 * | 3/2021 | Kelly | ............... G06T 19/006 |
| 10,950,049 B1 * | 3/2021 | Kelly | ..................... G06T 7/73 |
| 2003/0229900 A1 | 12/2003 | Reisman | |
| 2004/0189675 A1 | 9/2004 | Pretlove et al. | |
| 2008/0101456 A1 | 5/2008 | Ridge et al. | |

(Continued)

OTHER PUBLICATIONS

Editor, "uZoom Launches LiveShopCast to Power Live Video Sales", Home Business Magazine, Aug. 30, 2017, https://homebusinessmag.com/businesses/ecommerce/uzoom-launches-liveshopcast-power-live-video-sales/, pp. 1-4.

(Continued)

*Primary Examiner* — Jeffery A Brier
(74) *Attorney, Agent, or Firm* — Athorus, PLLC

(57) ABSTRACT

Described are systems and methods that enable users to virtually experience an environment at a destination location from their own user device, control their experience and even interact with others that are physically located within the environment. Likewise, the user's experience may even be improved with the inclusion of enhancements that are presented to the user as the user experiences the environment. Users may interact with the enhancements to obtain additional enhancements, interact with others physically located within the environment, interact with and direct a guide that is physically located within the environment, and receive near real-time video and audio that is transmitted from a guide device located within the environment.

20 Claims, 13 Drawing Sheets

(56) References Cited

U.S. PATENT DOCUMENTS

| | | |
|---|---|---|
| 2010/0088735 A1 | 4/2010 | Sadja et al. |
| 2013/0083003 A1 | 4/2013 | Perez et al. |
| 2014/0100996 A1 | 4/2014 | Klein et al. |
| 2014/0368532 A1 | 12/2014 | Keane et al. |
| 2015/0002540 A1 | 1/2015 | De et al. |
| 2015/0049812 A1 | 2/2015 | Ovsyannikov et al. |
| 2015/0127486 A1 | 5/2015 | Advani |
| 2015/0206542 A1 | 7/2015 | Gilson |
| 2015/0346722 A1 | 12/2015 | Herz et al. |
| 2016/0041581 A1 | 2/2016 | Piccionelli et al. |
| 2016/0103437 A1 | 4/2016 | Alfredsson et al. |
| 2016/0203586 A1 | 7/2016 | Chang et al. |
| 2016/0253795 A1 | 9/2016 | Cole et al. |
| 2016/0277802 A1 | 9/2016 | Bernstein et al. |
| 2016/0335917 A1 | 11/2016 | Lydecker et al. |
| 2016/0349509 A1 | 12/2016 | Lanier et al. |
| 2017/0041557 A1 | 2/2017 | Urich et al. |
| 2017/0061693 A1 | 3/2017 | Kohler et al. |
| 2017/0064154 A1 | 3/2017 | Tseng et al. |
| 2017/0124713 A1 | 5/2017 | Jurgenson et al. |
| 2017/0155725 A1 | 6/2017 | Rincon et al. |
| 2018/0115706 A1 | 4/2018 | Kang et al. |

OTHER PUBLICATIONS

Google Glass—Wikipedia, https://en.wikipedia.org/wiki/Google_Glass, downloaded from internet on Aug. 7, 2017, pp. 1-14.

Google Goggles—Wikipedia, https://en.wikipedia.org/wiki/Google_Goggles, downloaded from internet on Aug. 7, 2017, pp. 1-3.

Guven and Feiner, "Interaction Techniques for Exploring Historic Sites Through Situated Media," Proc. 3DUI '06 (Symposium on 3D User Interfaces), Alexandria, VA, Mar. 25-26, 2006, pp. 1-9.

Karsch, K., Golparvar-Fard, M., Forsyth, D. 2014 ConstructAide: Analyzing and Visualizing Construction Sites through Photographs and Building Models. ACM Trans. Graph. 33, 6, Article 176 (Nov. 2014), 11 pages.

Kinect—Wikipedia, https://en.wikipedia.org/wiki/Kinect, downloaded from internet on Aug. 7, 2017, pp. 1-15.

Microsoft HoloLens—Wikipedia, https://en.wikipedia.org/wiki/Microsoft_HoloLens, downloaded from internet on Aug. 7, 2017, pp. 1-8.

Samsung Gear VR—Wikipedia, https://en.wikipedia.org/wiki/Samsung_Gear_VR, downloaded from internet on Aug. 7, 2017, pp. 1-5.

URL: https://www.youvisit.com/ (Web Archive version dated Sep. 27, 2016, URL: https://web.archive.org/web/20160927064242/https://www.youvisit.com:80/), 7 pages.

Vlahakis et al., "Archeoguide: An Augmented Reality Guide for Archaeological Sites", IEEE Computer Graphics and Applications, Sep./Oct. 2002, pp. 52-60.

\* cited by examiner

AUGMENTING TRANSMITTED VIDEO DATA

CROSS-REFERENCE TO RELATED APPLICATIONS

This application is a continuation of and claims priority to U.S. application Ser. No. 15/282,357, filed Sep. 30, 2016, and claims priority to U.S. application Ser. No. 15/282,389, filed Sep. 30, 2016, the contents of each of which are herein incorporated by reference in their entirety.

BACKGROUND

Our world and universe is full of wonderful places, history, and natural wonders that people enjoy learning about and experiencing. People even plan special vacations, save money, and take time off from work to physically travel from their home location to a destination, often just to learn about and experience that destination location. However, physically visiting different locations is often cost and/or time prohibitive for many people. Others experience and learn about different places in the world by reading about those places, watching videos, and/or watching live presentations about those locations. However, those types of experiences require that the individual be a passive observer, watching and learning based on the information that is provided. The individuals do not have the ability to participate in or control the experience.

BRIEF DESCRIPTION OF DRAWINGS

The detailed description is described with reference to the accompanying figures.

DETAILED DESCRIPTION

Figure 1:
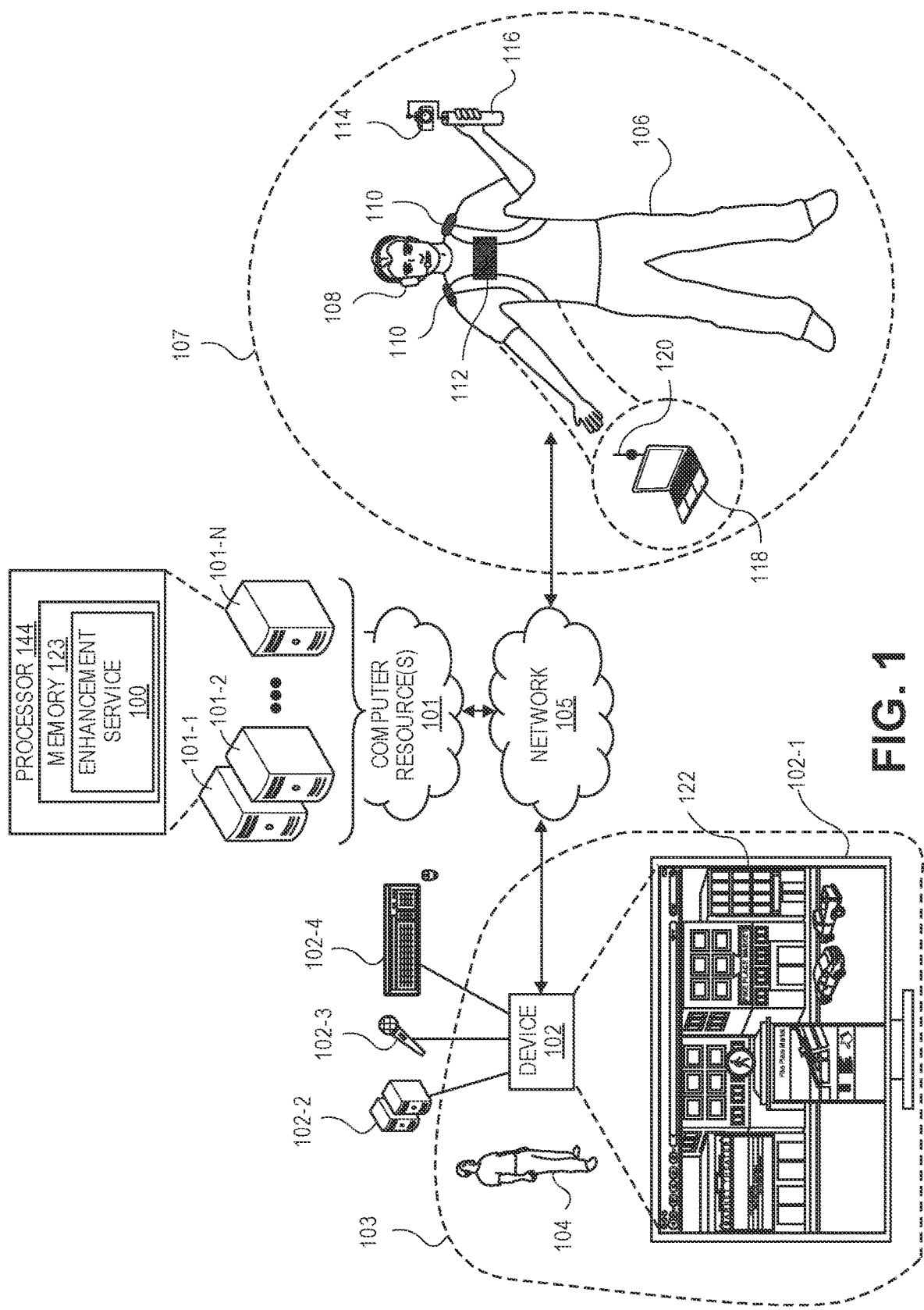
FIG. 1 illustrates an example environment in which guide transmitted environment information is augmented and presented to a user, according to an implementation.

Described are systems, methods, and apparatus that enable users to experience an environment at a destination location from their own user device, control the experience and even interact with others that are physically located within the environment. Likewise, the user's experience may even be improved with the inclusion of enhancements that are presented to the user as the user experiences the environment. User's may interact with the enhancements to obtain additional enhancements, interact with others physically located within the environment, interact with and direct a guide that is physically located within the environment, and receive near real-time video and audio that is transmitted from a guide device located within the environment. As used herein, an environment is any area or location in which a guide and guide device are located. An environment is also referred to herein as a destination location. For example, many of the examples discussed below relate to Pike Place Market and refer to Pike Place Market as a destination location. The destination location, or environment, may be experienced by a user that is receiving video data and audio from a guide device located within the environment or destination location. Other example environments or destination locations include, but are not limited to museums, buildings, factories, government facilities, parks, mountains, etc.

In one implementation, a guide with a guide device may be physically located at a destination location. The guide device is configured to transmit video data and audio data from the guide device to the user device, the user device being at any remote location. A user of the user device may be able to control a position of an imaging component (e.g., digital video camera) of the guide device, communicate with the guide, and/or communicate with others at the destination location by outputting the user's spoken audio from an output (e.g., speaker) of the guide device.

In addition, an enhancement service, which may be part of the guide device, remote from the guide device, and/or part of the user device, may process video data generated by the imaging component of the guide device to determine if one or more markers are present in the video data. A marker may include any detectable object (e.g., sign, building, plant, object) represented in the video data. If a marker is detected in the video data, an enhancement associated with the marker may be selected and used to augment the video data presented to the user such that the user is presented the video data and the enhancement. For example, if the user is experiencing Pike Place Market in Seattle, Wash., using the implementations discussed herein, and the video data includes images of the Pike Place Fish Market (a marker), a location known for throwing fish, the video data may be augmented with an enhancement that is relevant to the Pike Place Fish Market. For example, the enhancement that is presented with the video data may include historical information about the Pick Place Fish Market, include a visual presentation of a fish being thrown, include hour information indicating when fish are actually thrown, etc.

In addition to enhancing video data transmitted from a guide device to a user device for presentation to a user, as part of the implementations discussed herein, the transmitted data and/or the enhancements may be synchronized so all the content is presented together by the user device. In other implementations, the audio data may be transmitted and presented by the user device independent of the presentation of the video data and/or enhancements. For example, if the audio data only includes audio from the guide and/or objects not in a field of view of the imaging component, the audio data may be sent to and presented by the user device independent of the video data and/or the enhancements without the presentation being disruptive or confusing to the user. However, if it is determined that the audio data includes audio from an object (e.g., person) that is included in the field of view of the imaging component and thus, included in the video data, the audio data may be synchronized with the video data and/or the enhancement when presented by the user device.

In addition to synchronizing the audio data, video data, and/or the enhancements, the rendering and presentation of enhancements to augment video data may be sized so that the enhancements correspond with the size of the video data. For example, the video data may be processed to determine a relative size and/or relative position of one or more markers within the video data. Based on the determined size and position of the marker(s), the enhancement is rendered such that it has a size and position that when presented to augment the video data, the presented enhancement corresponds to the images of the video data. For example, if the enhancement is to augment the video data to present a Pike Place Fish Market worker throwing a fish, the size and position of the worker is presented in a manner that is consistent with the determined relative size and/or relative position of the Pike Place Fish Market represented in the video data.

FIG. 1 illustrates an example environment in which guide transmitted environment information is augmented and presented to a user, according to an implementation. As illustrated, the guide 106 is located at a destination location 107, which may be any location in the world, or as our travel capabilities continue to expand, any location in the universe. The guide carries and operates a guide device. The guide device includes at least one imaging component 114, such as a digital camera, a video camera, or other form of imaging component, that may be controlled by commands sent from a user device 102 and/or controlled by the guide 106. In some implementations, the imaging component 114 may be an infrared camera, a thermal imaging camera, and/or other form of imaging component. The user 104 and the user device 102 are positioned at any location, such as a user location 103 that is separate and distinct from the destination location 107. In some implementations, the imaging component 114 may be mounted to a gimbal 116, such as a two or three-axis gimbal that is held or otherwise mounted to the guide. In other implementations, the imaging component 114 may be mounted to the guide. The imaging component 114 captures images of the destination location in the form of video data and transmits those images over a network 105 to the user device 102 and/or to the remote computing resources 101 for processing by the enhancement service 100.

The guide device may also include one or more microphones 110 for receiving audio input from sounds within the destination location, and one or more speakers 112 for outputting sound into the environment. For example, the user 104, using a microphone at the user device 102 may provide audio input (e.g., speech) that is transmitted via the network 105 to the guide device and output through the one or more speakers 112 of the guide device.

The guide device may also include a headset 108 that enables audio communication directly between the user 104 and the guide 106. As illustrated, the headset 108 may also include a speaker (or earphone) that is used to output audio to the guide 106, and a microphone that is used by the guide to communicate directly with the user 104. The microphone(s) 110 and/or the microphone of the headset 108 may be configured to capture sounds (e.g., utterances) from a user speaking, other sounds of the destination location, and/or sounds (e.g., utterances) of the guide. The audio signal/data may then be sent over the network 105 to the user device 102 and output through a speaker of the user device.

The guide device may also include a computing component 118, a transmitter/receiver, and an antenna 120. The antenna 120 enables wireless transmission (transmitting/receiving) between the guide device, the remote computing resources 101 and the user device 102. Additional details of an example guide device are discussed further below with respect to FIG. 11.

Transmission between the guide device, the user device 102, and/or the computing resources 101 may be via a network 105. The network 105 may include wired technologies (e.g., wires, USB, fiber optic cable, etc.), wireless technologies (e.g., RF, cellular, satellite, Bluetooth, etc.), and/or other connection technologies. The network 105 carries data between the guide devices, the remote computing resources 101, and one or more user devices 102. For example, the network 105 may carry video data and/or audio data from the guide device to the user device 102 so that the video data and/or audio data can be presented by the user device 102 to the user 104 in near real-time. For example, the presentation 122 may be video data generated from the imaging component 114 of the guide device. The presentation 122 may include the video data, which may be augmented with one or more enhancements, as discussed further below. The presentation may be displayed on a display 102-1 of the user device 102, projected by a camera of the user device, output audibly using speakers 102-2 of the user device 102, etc.

In some implementations, video data and/or audio data from a guide device may be transmitted to multiple user devices. For example, video data and/or audio data from the guide device may be transmitted over the network 105 to the computer resources 101 and the computer resources may send the video data and/or audio data to the user device 102 and one or more other user devices. Likewise, the enhancements used to augment the video data may be different for different users and/or different user devices. For example, a first set of enhancements may be used to augment video data that is presented to the user 104 via the user device 102 and a second set of enhancements may be used to augment video data that is presented to a second user via a second user device. As discussed below, the video data from the guide device may be augmented with the different enhancements at the guide, at the enhancement service 100 and/or at the user device(s) 102. For example, the enhancement service 100 may generate first augmented video using video data from the guide device and enhancements corresponding to a first user 104 that is sent to the first user device 102 for presentation to the first user 104. The enhancement service 100 may likewise generate second augmented video using the video data from the guide device and using enhancements corresponding to a second user that is sent to a second user device for presentation to the second user. As will be appreciated, any number of augmented videos may be generated using video data from the guide device, different enhancements from different enhancement sets, and sent to any number of user devices. Likewise, in some implementations, the same augmented video may be sent to more than one user device.

As illustrated, the remote computing resources 101 may include one or more servers, such as servers 101-1, 101-2, . . . , 101-N. These servers 101-1-101-N may be arranged in any number of ways, such as server farms, stacks, and the like that are commonly used in data centers. Furthermore, the servers 101-1-101-N may include one or more processors 144 and memory 123 which may store the enhancement service 100 and execute one or more of the processes or features discussed herein.

The user device 102 may be any type of device that is capable of receiving and presenting video data, audio data, and enhancements to a user 104 and that is capable of transmitting control instructions to the guide device to control the imaging component 114 of the guide device. For example, the user device 102 may be a cellular phone, smart phone, desktop, laptop, and/or any other form of computing device. The user device 102 may be configured to include, among other components, a display 102-1, such as a touch-based display, one or more speakers 102-2, one or more microphones 102-3, and/or one or more interface components such as a mouse or keyboard 102-4. The speakers output sounds transmitted from the guide device to the user device 102. The microphone(s) 102-3 capture sounds (e.g., utterances) from a user 104 speaking. Those sounds are converted into audio signals, transmitted over the network 105 to the guide device and output through the guide's 106 headset 108 and/or the speakers 112. The interface components, such as the mouse and keyboard 102-4 may be used to control the orientation of the imaging component 114 of the guide device. For example, the user 104 may utilize an interface component to input direction or orientation commands that are transmitted over the network 105 to the guide device and used to control or alter the position or orientation of the imaging component 114.

Figure 2:
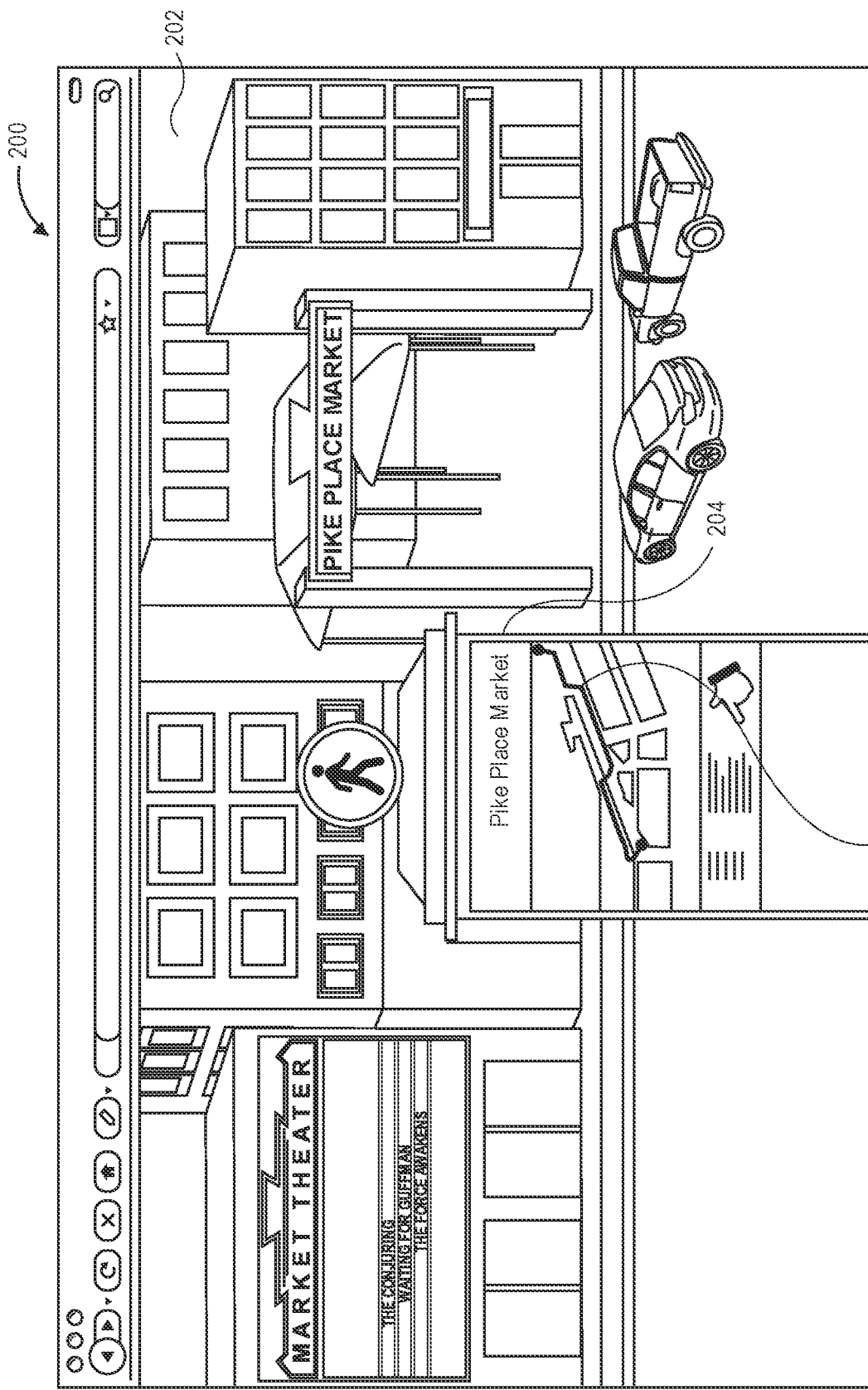
FIG. 2 illustrates an example of augmented video data presented by a user device, according to an implementation.

As video data is captured by the imaging component 114 of the guide device, the video data is processed to determine if the video includes one or more markers. As discussed further below, processing of the video may be done by the computing component 118 of the guide device, by the enhancement service 100 operating on the remote computing resources 101, by the user device 102, and/or by a combination of two or more of the computing component 118 of the guide device, the enhancement service 100, and the user device 102. For example, FIG. 2 illustrates an example of augmented video data 200 presented by a user device, according to an implementation. In this example, video data 202 is generated with an imaging component of a guide device and processed using one or more image processing techniques to determine if a marker is present in the video data.

For example, one or more object detection algorithms, edge detection algorithms, etc. may be used to detect objects in the video data and those objects may be compared with a plurality of stored marker information corresponding to markers within the destination location. In some implementations, objects in video data may be detected using the Scale-Invariant Feature Transform (SIFT) algorithm and the detected objects compared with marker information maintained in a data store. If a detected object corresponds with a marker, the marker is determined and one or more enhancements associated with the marker may be selected and used to augment the video data presented by the user device.

In the example illustrated in FIG. 2, the video data 202 includes a marker 204 in the form of a map sign of Pike Place Market. As the video data is processed, the marker 204 is detected and an enhancement 206 is rendered and presented to augment the video data 202 to produce augmented video data 200. In this example, the enhancement 206 illustrates an intended route through Pike Place Market that will be followed by the guide as part of the experience for the user that is receiving data from the guide device. The enhancement 206 is rendered at a size and position based on the determined size and position of the marker 204 so that the enhancement 206 is presented in a manner consistent with the video data 202. Specifically, in this example, the enhancement 206 appears to overlay the map of Pike Place Market to illustrate to the user the route planned for the guide. However, as noted above, because the user has the ability to communicate and provide instructions to the guide, the planned route illustrated by the enhancement 206 may not be the route actually followed by the guide. The planned route may correspond to an area of known interest within the destination location, areas that include enhancements, etc. The user may request that the guide follow a route other than the planned route.

As discussed further below, the enhancement 206 is presented with the video data 202 and the position of the marker represented in the video data may be monitored. If the position and/or size of the marker moves, for example, in response to the guide or the imaging component of the guide device moving, the position and/or size of the enhancement will be updated so that enhancement continues to be presented with the video data in an appropriate manner. In other implementations, the enhancement may not be registered to a specific marker represented in the video and if the imaging component or the guide move, the enhancement will continue to be presented. For example, an enhancement may be associated with a direction or orientation of the imaging component of the guide device and as long as the imaging component is oriented in that direction, the enhancement will be rendered and presented. For example, an enhancement in the form of local weather conditions may be rendered and presented anytime the imaging component of the guide device is oriented upward a defined amount (e.g., oriented toward the sky). When the imaging component is oriented upward by the defined amount, the enhancement is rendered and presented. As another example, an enhancement in the form of a planned route and/or map of the environment in which the guide is located may be rendered and presented anytime the imaging component of the guide device is oriented downward a defined amount (e.g., oriented toward the ground). When the imaging component is oriented downward by the defined amount, the enhancement is rendered and presented.

Figure 3:
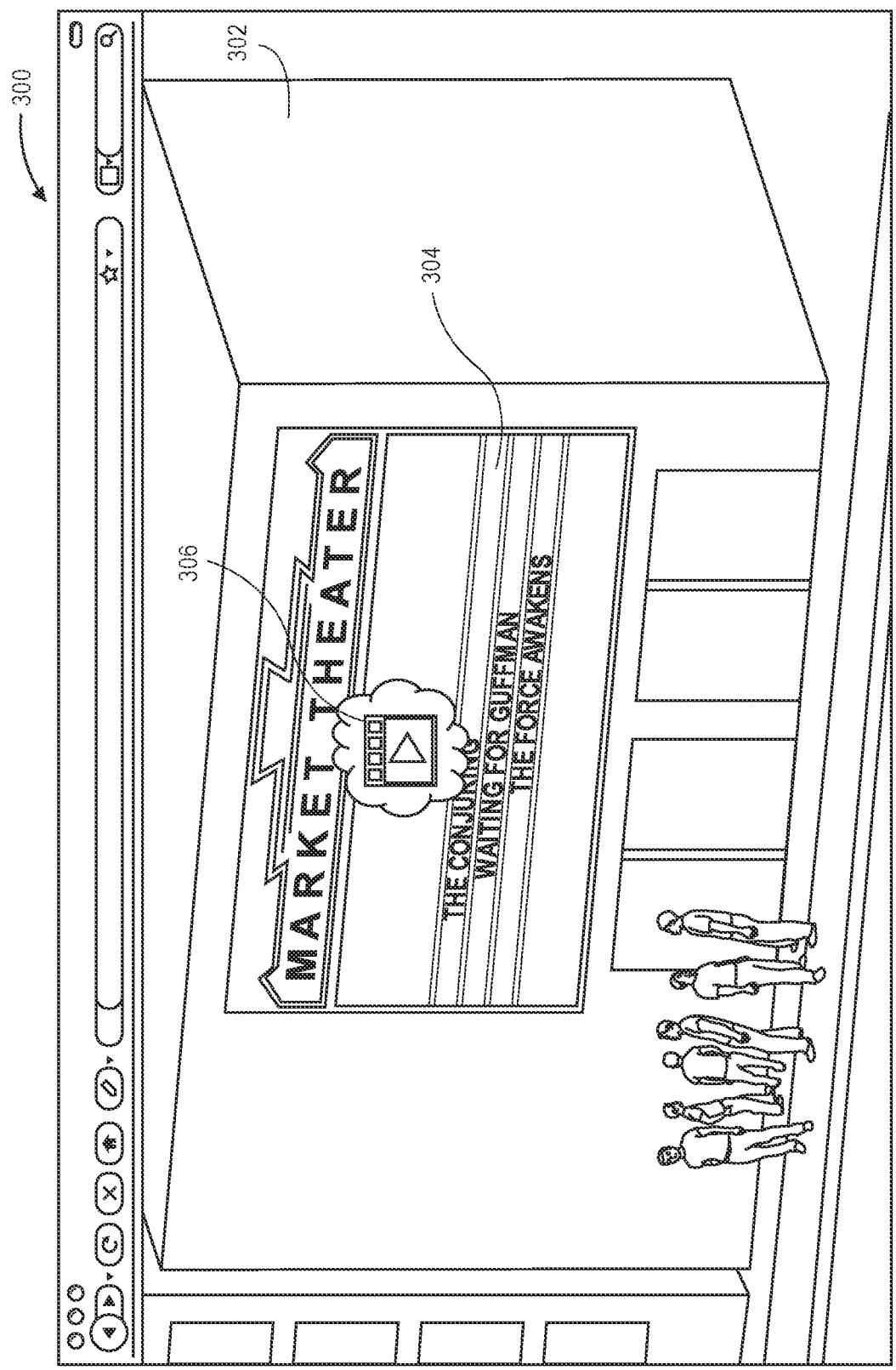
FIG. 3 illustrates an example of video data sent from a guide device at a destination location and presented by a user device that includes an enhancement, according to an implementation.

In some implementations, upon detection of a marker, it may be determined that an interactive enhancement is to be presented to augment the presented video data from the guide device. For example, FIG. 3 illustrates an example of video data 302 sent from a guide device at a destination location and presented by a user device that includes an enhancement 306, according to an implementation. In this example, the enhancement may be interacted with by the user to obtain additional information and/or additional enhancements. For example, upon detection of a marker 304, in this example the Market Theater sign, an enhancement associated with the marker 304 is selected and presented with the video data 302 to produce augmented video data 300. In this example, the enhancement provides an indication to the user that additional information in the form of a video enhancement is available to the user if the user interacts with the presented enhancement 306. The user that is viewing the presented augmented video data 300 on the user device may choose to select the enhancement 306, ignore the enhancement 306, other take other actions (e.g., send a command that causes the imaging component to be reoriented, provide a verbal instruction to the guide to travel in a different direction, etc.).

If the user interacts with the enhancement, the video data is further augmented with another enhancement. A user may interact with the enhancement by, for example, selecting the enhancement with a mouse or other form of input device, touching the presentation of the enhancement if presented by a touch-based display of the user device, etc.

Figure 4:
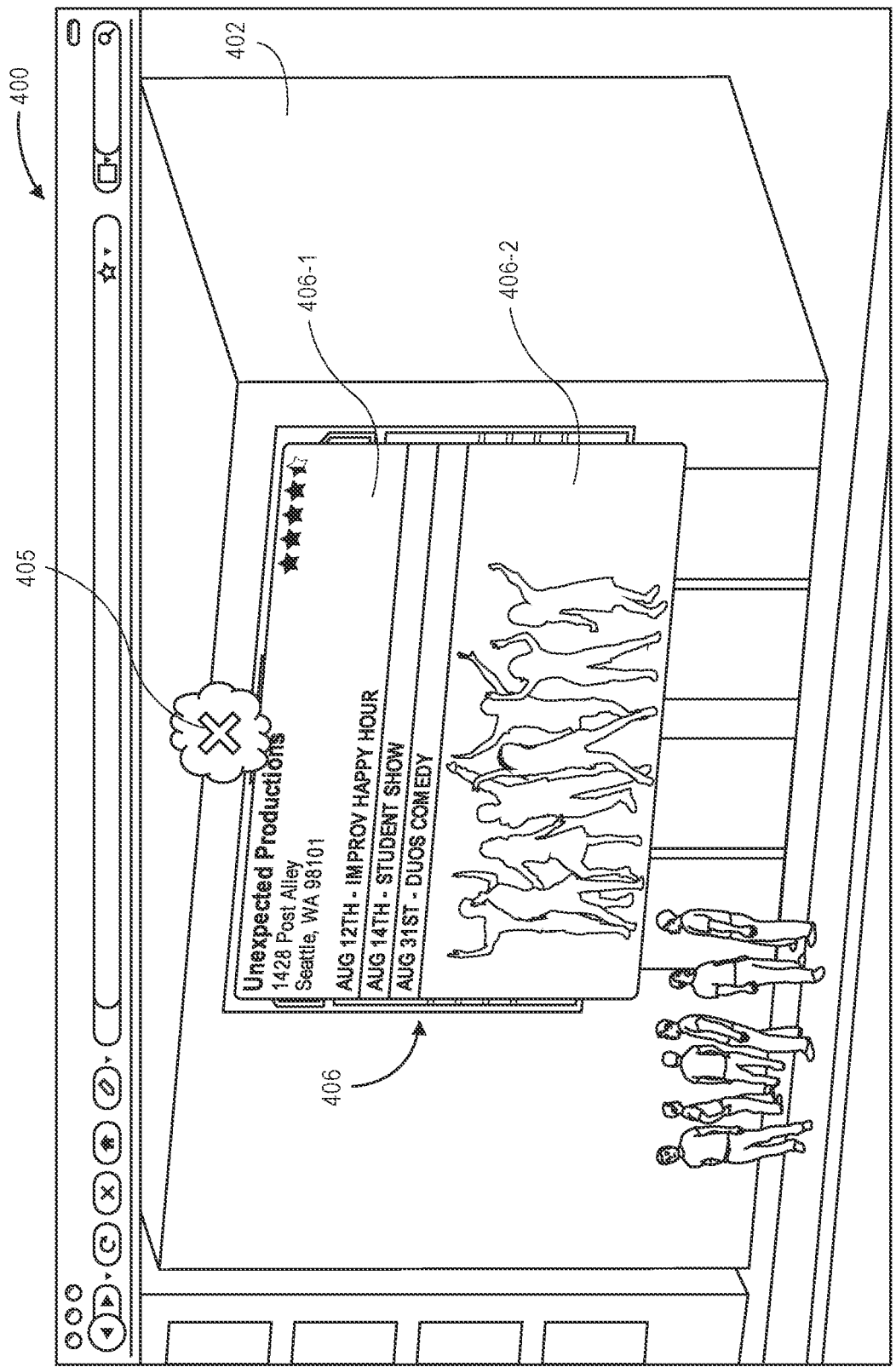
FIG. 4 illustrates an example of video data sent from a guide device at a destination location and presented by a user device that includes an additional enhancement that is presented in response to a user selecting the enhancement illustrated in FIG. 3, according to an implementation.

FIG. 4 illustrates an example of video data 402 sent from a guide device at a destination location and presented by a user device that includes an additional enhancement 406 that is presented in response to a user selecting the enhancement 306 illustrated in FIG. 3, according to an implementation. In this example, the enhancement 406 includes current information 406-1 corresponding to the marker and a video 406-2 corresponding to the marker. Specifically, in this example, the current information 406-1 includes show times and dates for a production that is currently playing at the Market Theater and the video 406-2 includes a short marketing clip of the production that is currently playing at the Market Theater.

In other implementations, an enhancement 406 may provide other information relevant to the marker and/or the destination location. For example, the enhancement may include weather information at the destination location, historical information about the marker, historical information about the destination location, historical information about an object within the destination location, current information about the marker, current information about the destination location, current information about an object within the destination location, future information about the marker, future information about the destination location, future information about an object within the destination location, a planned direction of travel within the destination location, a position of the guide device within the environment, an orientation of an imaging component of the guide device, information about an object (e.g., other building, people, places) not within the environment, etc.

In some implementations, the enhancement may include data that is periodically updated (aka, live data). For example, an enhancement may include a current count of people at the destination location, the current time, the current weather, current videos, etc. Likewise, in some implementations, an enhancement may include information relating to places other than the destination location. For example, an enhancement may include video or information relating to a different destination location, or any other location. As one example, if the guide device is transmitting video of the destination location that includes a representation of the Seattle Space Needle (a marker) the rendered and presented enhancement may include images of similar structures at other locations (e.g., CN Tower in Toronto, Ontario or Reunion Tower in Dallas, Tex.), or information about similar structures at other locations. Alternatively, or in addition thereto, the enhancement may include live and/or recorded video from atop the Space Needle, and/or from other locations. For example, a live streaming video camera may be positioned atop the Seattle Space Needle that transmits video captured by the video camera. The implementations described herein may utilize the streaming video and render and present the video streamed from the camera atop the Space Needle to the user as an enhancement. In some implementations, a guide may dynamically create an enhancement that is presented to the user as part of the experience.

Returning to FIG. 4, a user viewing the augmented video data 400 that includes the video data 402 sent from the guide device and presented in near real-time on the user device along with the enhancement 406 may continue to view the enhancement or provide an input at enhancement position 405 to minimize or remove the enhancement from the presented information.

Figure 5:
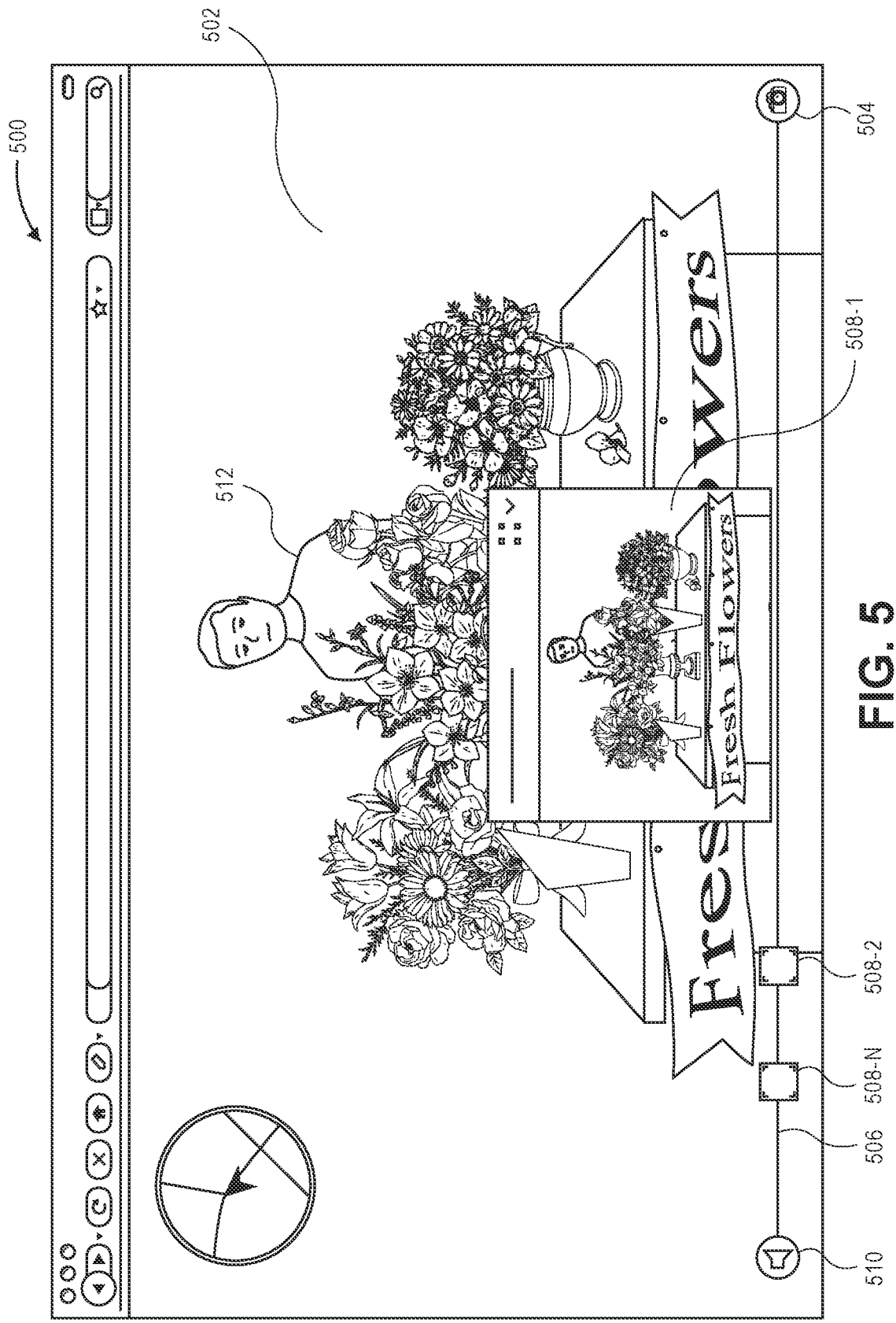
FIG. 5 illustrates an example of video data sent from a guide device at a destination location and presented by a user device, according to an implementation.

In addition to being presented with near real-time video data, audio data, and enhancements, and having the ability to control what information is presented, the route of the guide, and/or the orientation of the imaging component of the guide device, in some implementations, a user may directly interact with objects, such as individuals, merchants, etc. at a destination location. For example, FIG. 5 illustrates an example of video data 502 sent from a guide device at a destination location and presented by a user device, according to an implementation. In this example, the video data includes a merchant 512 (e.g., person) that is located at the destination location. The user, by interacting with the user device is able to communicate directly with the merchant 512, regardless of the location of the user. For example, the user may select the audio control 510 and speak into a microphone of the user device. After providing the audio input and releasing the audio control, the input audio is converted to audio data and transmitted from the user device to the guide device. At the guide device, the received audio data is output from a speaker of the guide device at a volume such that the merchant can hear the speech provided by the user. The merchant may then respond to the output audio and the microphone(s) of the guide device will receive the audio output by the merchant and the guide device will transmit that audio, in the form of audio data to the user device for presentation to the user. As discussed further below, because the audio data from the destination location includes audio from a merchant that is represented in the video data, the transmitted audio data and video data may be synchronized when presented by the user device.

In some implementations, a user may be able to communicate with a merchant, or other individual, at the destination location and complete a transaction, such as a purchase of an item, between the user and the merchant. For example, the user may interact with the merchant 512 and complete a purchase of an item from the merchant 512. Payment for the item may be physically completed by the guide and/or may be completed between the user and the merchant via a network based communication between the user device and the merchant. Likewise, the purchased item may be provided to the guide, shipped by the merchant to a user specified delivery location, etc.

In some implementations, a user may obtain images of the destination location by interacting with the user interface 500. For example, a user may obtain an image of the destination location that is in the field of view of the imaging component by selecting the camera control 504. Upon selecting the camera control 504, a digital image of the field of view of the imaging component is obtained and provided to the user device. The digital image may include a representation of the destination location as captured by the imaging component of the guide device. Alternatively, the digital image may include a representation of the destination location as captured by the imaging component of the guide device and a representation of any enhancements that are presented to produce the augmented digital video. Likewise, in some implementations, the user may interact with the user interface 500 to obtain one or more digital videos of a time duration that include recorded video of the destination location that is within the field of view of the imaging component of the guide device. Like any obtained digital images, the digital video may or may not include any enhancements that are presented to produce the augmented video data that is presented by the user device.

In some implementations, the user interface 500 may also include a timeline 506 that includes indications along the timeline each time a digital image or digital video is generated and provided to the user device. Likewise, at the time a digital image is generated, it may be presented to the user as part of the user interface 500 so the user can confirm the digital image includes the desired information. In this example, the user has generated a digital image of the merchant and the user interface 500 includes a preview 508-1 of the recently generated digital image. In addition, the timeline illustrates that the user has previously generated two other digital images 508-2 and 508-N. As will be appreciated, any number of digital images and/or digital videos of the destination location may be generated, provided to the user device, and represented on the timeline 506.

Figure 6:
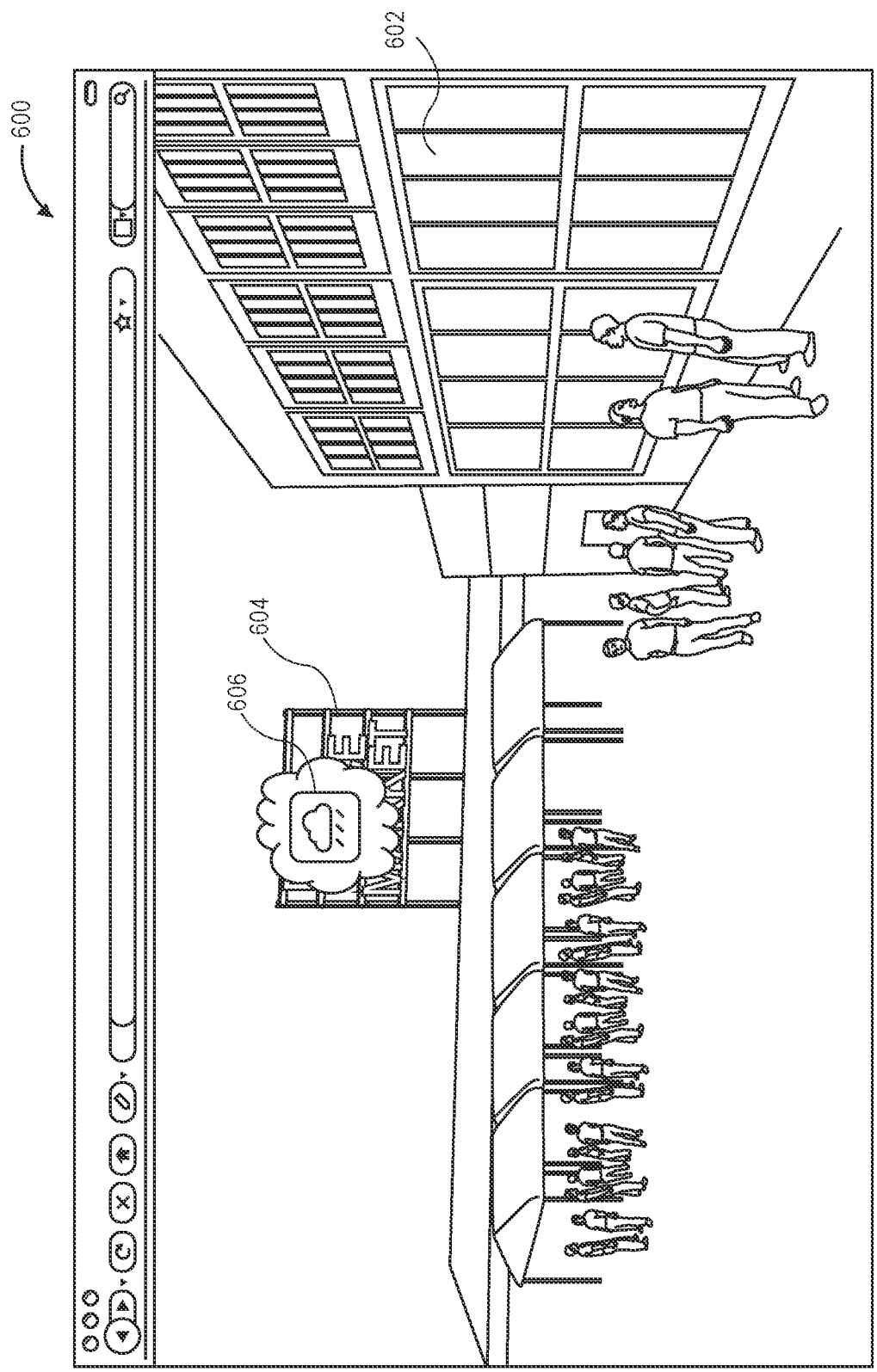
FIG. 6 illustrates an example of video data sent from a guide device at a destination location and presented by a user device, according to an implementation.

FIG. 6 illustrates an example of video data 602 sent from a guide device at a destination location and presented by a user device that includes an enhancement 606, according to an implementation. Similar to the above discussion, the video data is processed and a marker 604 detected. Upon detection of a marker, an enhancement 606 associated with the marker 604 may be rendered and presented with the video data 602 to produce augmented video data 600 that is presented by the user device.

In this example, the enhancement 606 may be interacted with by the user to obtain additional information and/or additional enhancements. For example, upon detection of a marker 604, in this example the Pike Place Market sign, an enhancement associated with the marker 604 is selected and presented with the video data 602 to produce augmented video data 600. In this example, the enhancement provides an indication to the user that additional information in the form of weather information is available to the user if the user interacts with the presented enhancement 606. The user that is viewing the presented augmented video data 600 on the user device may choose to select the enhancement 606, ignore the enhancement 606, other take other actions (e.g., send a command that causes the imaging component to be reoriented, provide a verbal instruction to the guide to travel in a different direction, etc.).

If the user interacts with the enhancement 606, the video data is further augmented with another enhancement. A user may interact with the enhancement 606 by, for example, selecting the enhancement with a mouse or other form of input device, touching the enhancement if presented on a touch-based display of the user device, etc.

Figure 7:
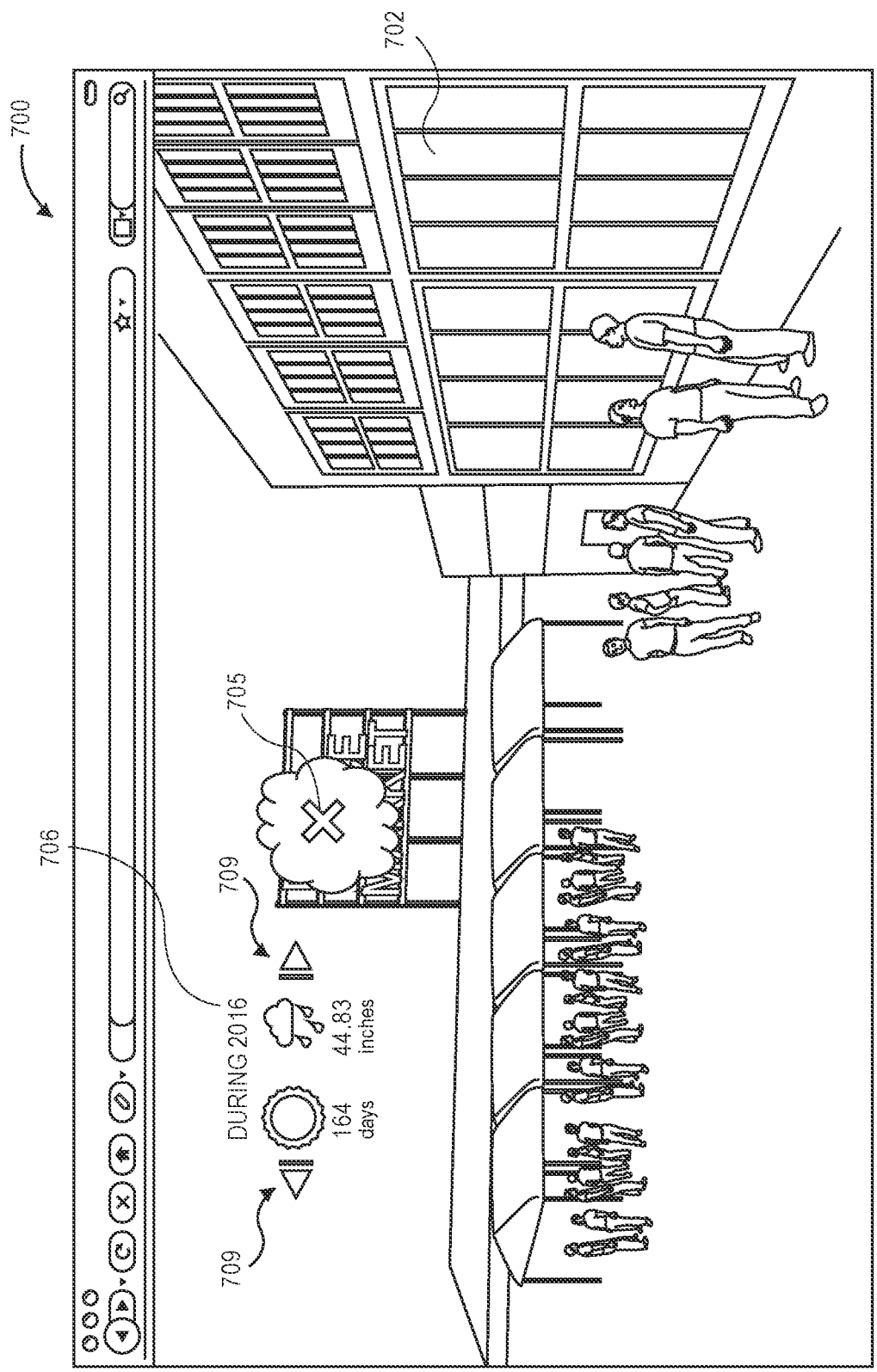
FIG. 7 illustrates an example of video data sent from a guide device at a destination location and presented by a user device that includes an additional enhancement that is presented in response to a user selecting the enhancement illustrated in FIG. 6, according to an implementation.

FIG. 7 illustrates an example of video data 702 sent from a guide device at a destination location and presented by a user device that includes an additional enhancement 706 that is presented in response to a user selecting the enhancement 606 illustrated in FIG. 6, according to an implementation. In this example, the enhancement 706 includes weather information for the destination location being viewed by the user. Specifically, in this example, the weather information provides the total days of sunshine and the total inches of rain for the destination location during the year 2016. The user may be provided still further enhancements by selecting one or more of the presented enhancement controls 709. For example, if the user selects one of the enhancement controls 709, the enhancement may be updated to include current weather information for the destination location, forecasted weather information for the destination location, etc. Likewise, a user viewing the augmented video data 700 that includes the enhancement 706 and the video data 702 sent from the guide device and presented in near real-time on the user device may continue to view the enhancement or provide an input at enhancement position 705 to minimize or remove the enhancement from the presented information. In addition, as the video data 702 is being presented, the position and size of the marker may be monitored. If the position and/or size of the marker in the video data change, the corresponding position and/or size of the presented enhancement may likewise be updated so that the presented enhancement remains in the appropriate perspective with the video data.

Enhancement information that may be used to generate enhancements and augment video data may be provided by the enhancement service, guides, users, and/or remote entities (e.g., weather stations, new stations, advertising agencies, historical societies, etc.). In some implementations, a user may select a category or type of enhancements that may be utilized to augment video data corresponding to an environment. For example, an environment or destination location, such as Pike Place Market, may include multiple different sets of enhancements that may be selected by the user. One set of enhancements may relate primarily to historical information about the destination location, another set of enhancements may relate primarily to food related topics, and yet another set of enhancements may relate primarily to architecture of Pike Place Market. Based on the user's own interest the user may select one or more sets of enhancements that are to be used to augment video data for the destination location.

While the examples discussed above describe the use of the implementations to explore areas such as Pike Place Market, the implementations discussed herein may likewise be used to explore and/or experience other areas for similar or different purposes. For example, the guide and guide device may be located in a warehouse or factory and transmit audio and video data to a user at a remote location for inspection purposes, or other business purposes. In such examples, markers within the destination location (e.g., warehouse, factory) may be detected and enhancements relevant to the environment and the purpose may be presented. For example, if the implementations described herein are being used to inspect a warehouse, markers (e.g., fire extinguishers, elevators, restrooms) within the warehouse may be detected and enhancements that provide information relating to prior inspections, violations, other images of the location, etc., may be generated and provided to the user. In other examples, if the imaging component includes, for example, an infrared camera or a thermal imaging camera, the markers may correspond to heat signatures detected by the imaging component. For example, a marker may be detected in areas where high heat dissipation from equipment is detected. The enhancement presented upon detection of the marker may provide information relating to the amount of heat detected, information about the equipment, etc. As still another example, image data from the imaging component (such as an infrared camera) may processed to detect imperfections and/or cracks in surfaces. Such imperfections may be detected as markers and the generated and presented enhancement may include a presentation that highlights or indicates to the user the presence of the imperfection.

In still other examples, the implementations described herein may be utilized to enable disabled persons, hospitalized persons, etc., to experience other environments and/or perform tasks that they otherwise would not be able to accomplish. For example, a guide may be located in a grocery store and provide video and/or audio data to a user who is disabled and unable to visit the grocery store themselves. The markers may correspond to items of interest to the user (e.g., shopping list items, recommended items, sale items). As the guide moves through the grocery store, image data from the guide device are processed to detect the markers. As markers are detected, enhancements are generated that may, for example, highlight or indicate the item to the user, provide information about the item to the user, etc. The user, upon locating an item of interest may then instruct the guide to retrieve and purchase the item on the user's behalf.

As will be appreciated, the implementations discussed herein may be used for a wide variety of purposes and the provided examples are for illustration only and should not be considered limiting.

Figure 8A:
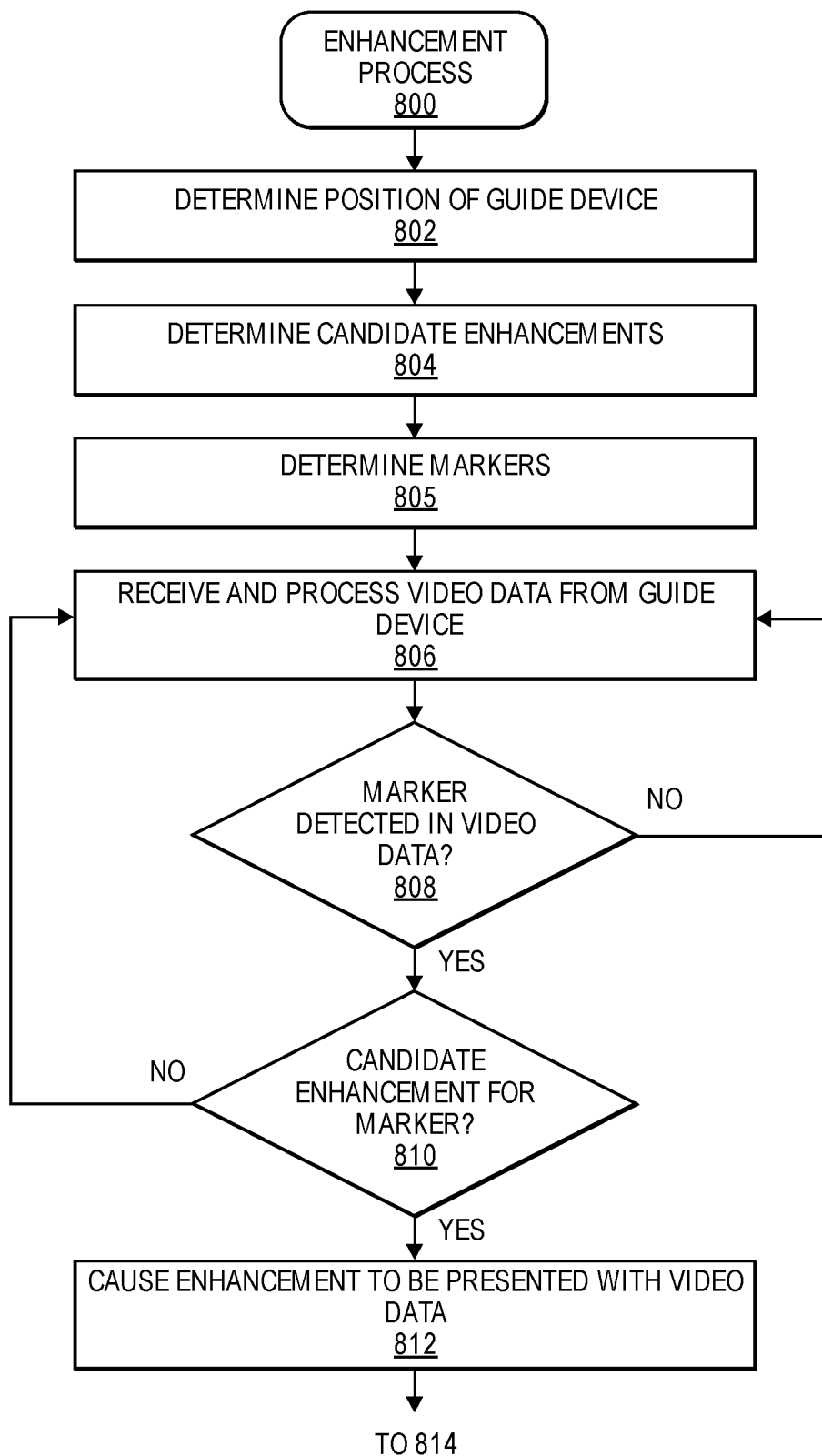
FIGS. 8A and 8B illustrate an example enhancement process, according to an implementation.
Figure 8B:
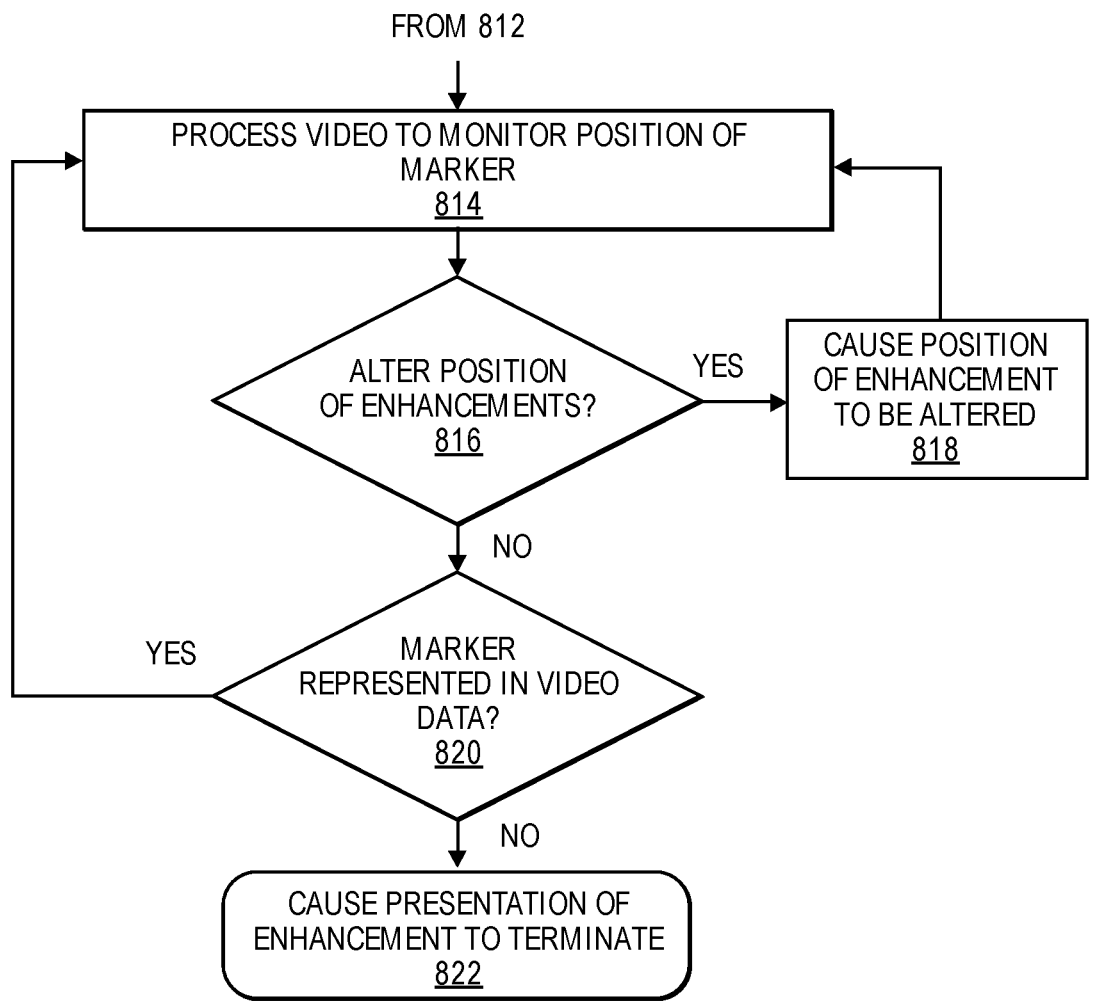

FIGS. 8A and 8B illustrate an example enhancement process 800, according to an implementation. The process of FIGS. 8A and 8B and each of the other processes and sub-processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 800 initiates by determining a position of the guide device, as in 802. The position of the guide device may be determined using, for example, global positioning system (GPS) information, indoor positioning information, or other forms of location determining information. In some implementations, the orientation or field of view of the imaging component of the guide device may also be determined. For example, the gimbal to which the imaging component is coupled may include a compass, inertial measurement unit, and/or other alignment components and provide orientation information that is used to determine an orientation or field of view of the imaging component.

In addition to determining the position of the guide device, a plurality of candidate enhancements are determined, as in 804. Candidate enhancements may be determined based on one or more of the destination location, the location of the guide device within a destination location, a guide, a user device, or a user that is being presented with augmented video data of the destination location. For example, enhancement information may be maintained in a data store accessible by the example process 800. Each item of enhancement information may include or be associated with one or more destination location identifiers, one or more geographic coordinates, one or more markers, one or more user devices, one or more users, one or more guide devices, one or more guides, etc. Likewise, a plurality of enhancements may be defined for a destination location, the destination location specified by a geographic area, geo-fencing, etc. For example, if the destination location is Pike Place Market, the destination location may be defined as a geographic area that encompasses Pike Place Market. Any enhancements associated with markers located within that destination location may be included in a determined plurality of candidate enhancements.

Likewise, the example process determines markers for the destination location, as in 805. Similar to enhancements, marker information may be maintained in a data store accessible by the example process 800. Marker information may include, for example, a size, shape, and/or color of the marker, a geographic location of the marker, a position of the marker with respect to other markers and/or other objects located near the marker, etc. Marker information may also include an indication or association of the enhancements that are associated with the marker. Based on the marker information, markers within the destination location are determined. For example, all markers within the destination location or within a defined distance of the destination location may be determined. In other implementations, only markers associated with a determined candidate enhancement may be selected.

Video data generated by the guide device is then received and processed, as in 806. Processing of the video data may be performed by an enhancement service operating on the computing system of the guide device, by the enhancement service operating on remote computing resources, by an enhancement service operating on the user device, or any combination thereof. The video data is processed using one or more image and/or video processing algorithms, such as the SIFT algorithm, to detect objects and/or markers represented in the video data. In some implementations, objects detected in the video data may be compared with marker information of the determined markers for the destination location to determine whether a marker is represented in the video data. Alternatively, the marker information may be used as a seed value for the algorithm such that the algorithm is only searching for objects that correspond to one of the determined markers, thereby reducing the time required to process the video data. In some implementations, if the orientation of the imaging component of the guide device and/or the position of the guide device within the destination location are determined, processing of the video data may be further reduced to only consider markers that are potentially within the field of view of the imaging component of the guide device and/or within a defined distance of the guide device.

As the video data is processed, a determination is made as to whether a marker is detected in the video data, as in 808. If a marker is not detected in the video data, the example process 800 returns to block 806 and continues. If a marker is detected, a determination is made as to whether a candidate enhancement is associated with the detected marker, as in 810. For example, as mentioned above, data stores accessible to the example process 800 may include marker information and enhancement information and one or both of the marker information and the enhancement information may include an indication of an association between each marker and enhancement. In some implementations, if only markers associated with a candidate enhancement are searched for during processing of the video data, upon detection of a marker, an enhancement will be determined.

If it is determined that no enhancement is associated with the detected marker, the example process 800 returns to block 806 and continues. If an enhancement is associated with the detected marker, the example process 800 causes the enhancement to be presented by the user device with the near real-time presentation of the video data to produce augmented video data, as in 812. As discussed below with respect to FIG. 10, the rendering and presentation of the enhancement may be based on a determined relative size and/or relative position of the marker as determined from the video data so that the enhancement is presented in a manner consistent with the presented video data. In some implementations, a quality of the video data presented at the user device may also be determined and the enhancement may be rendered at the same or similar video quality. For example, if the video data is compressed using one or more video compression algorithms, the quality of the video may be degraded as part of the compression. In such an example, rather than rendering the enhancement at a higher video quality, the enhancement may be rendered and presented at the same or similar video quality as the video data.

As the enhancement is presented, the video data continues to be generated by the guide device. The generated video data is processed to monitor a position of the marker represented in the video data, as in 814. Processing of video data to monitor a position of an already detected marker may be faster than processing video data to detect a presence of a marker. For example, the video data may be processed using one or more image processing algorithms (e.g., edge detection, object detection) and that algorithm may only be searching for objects corresponding to the already detected marker. Likewise, because the marker has already been detected in a prior frame of the video data, an expected position or area within the video data may be determined based on the position of the marker in prior frames. As such, video data may be processed in an ordered fashion, processing first the area of the video data in which the marker is expected to be positioned.

Based on the processing of the generated video data to monitor the positon of the marker, a determination is made as to whether the position of the presented enhancement if to be altered, as 816. Such alteration may likewise include altering a size and/or orientation of the presented enhancement. For example, if the marker is determined to have moved from one position in a prior frame to a different position in the current frame of the video data, it may be determined that the position of the presented enhancement is to be updated to correspond to the amount of movement of the marker. Likewise, if the size and/or orientation of the marker is determined to change between frames of video (e.g., the marker increases or decreases in size between video frames), it may be determined that the size and/or position of the presented enhancement should be adjusted an amount similar to the determined change of the marker.

If it is determined that the position of the enhancement is to be altered, the example process 800 causes the position of the presented enhancement to be altered, as in 818. For example, the example process 800 may transmit position update information or delta information indicating a change in position of the marker between a prior position and an altered position. The transmitted information may then be used to update the position of the presentation of the enhancement. Likewise, if the size and/or orientation of the enhancement is to be altered, the example process 800 may send information relating to an altered size or orientation of the enhancement that may be used to update a rendering and presentation of the enhancement.

If it is determined that the position of the enhancement is not to be altered, a determination is made as to whether the marker is represented in the processed video data, as in 820. If it is determined that the marker is still represented in the video data, the example process returns to block 814 and continues. However, if it is determined that the marker is no longer represented in the video data (e.g., the orientation of the imaging component of the guide device has been altered such that the marker is no longer in the field of view of the imaging component), the example process 800 sends instructions that cause the presentation of the marker to terminate, as in 822.

As discussed above, video data from a guide device may be augmented using the same or different sets of enhancements and sent to multiple different user devices. In such an implementation, the example process 800 may be performed multiple times in parallel for each user device or set of enhancements that may be used to augment the video data from the guide device. For example, the example process 800 may be used to produce first augmented video data using the video data from the guide device and a first set of enhancements associated with a first user device or a first user and that first augmented video data may be sent to the first user device for presentation to the first user. Likewise, the example process 800 may be used to produce second augmented video data using the video data from the guide device and a second set of enhancements associated with a second user device or a second user and that second augmented video data may be sent to the second user device for presentation to the second user. Some or all of the enhancements included in the first set of enhancements may be different than enhancements included in the second set of enhancements.

Figure 9:
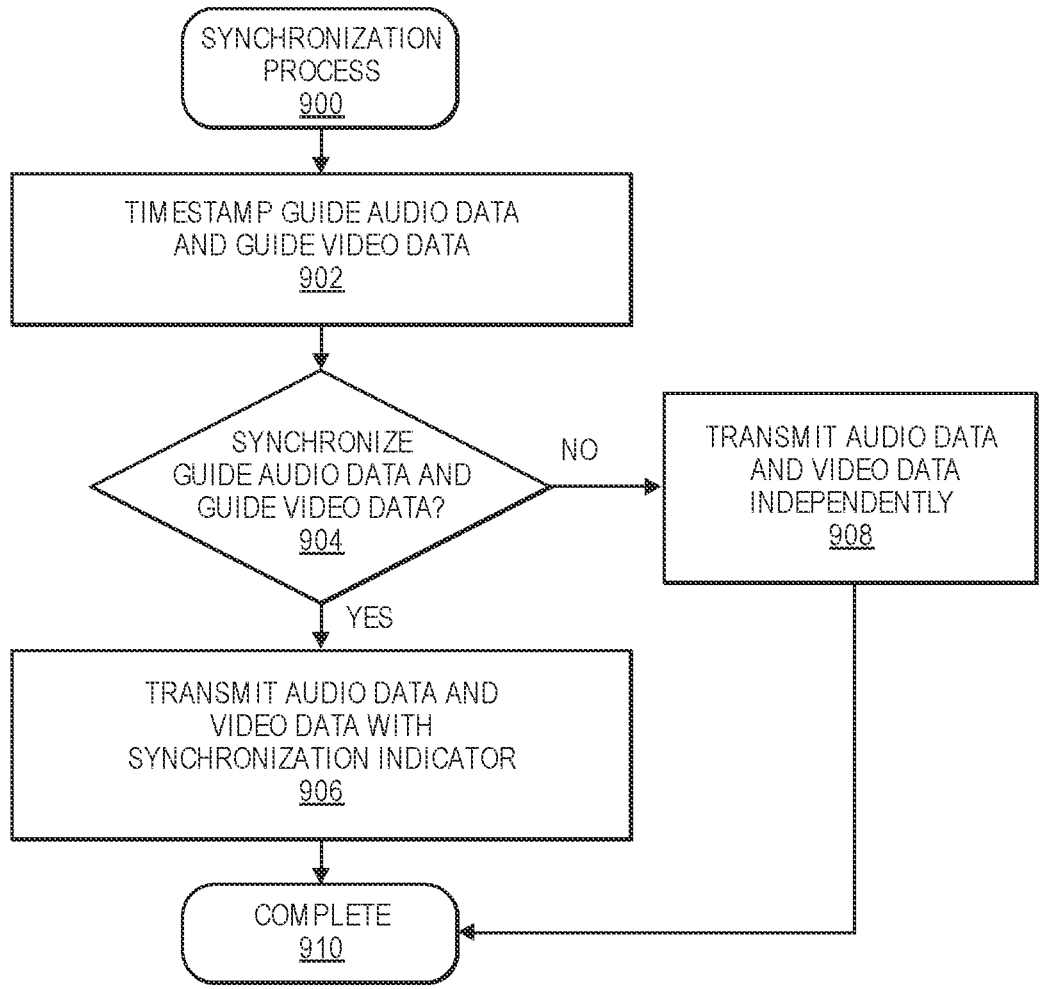
FIG. 9 illustrates an example synchronization process, according to an implementation.

FIG. 9 illustrates an example synchronization process 900, according to an implementation. As discussed above, audio data and video data from the guide device may be transmitted as separate data from the guide device to the user device and/or to the remote computing resources and the enhancement service. Because the amount of audio data is generally less than the amount of video data produced during the same period of time, the audio data can be processed, transmitted and presented faster than the video data. To keep the video data and the audio data synchronized, either the presentation of the audio data must be delayed until it can be synchronously presented with the video data and/or the quality of the video data must be reduced so that the image data is smaller and can be process, transmitted, and presented faster. However, in some instances of the present implementation, synchronization of the video data and the audio data may not be necessary for the user experience and the presentation by the user device.

As video data and audio data are obtained by the guide device, a timestamp is associated with the audio data and the video data, as in 902. For example, each of the audio data and the video data may be initially processed by the computing component of the guide device prior to transmission from the guide device. As the audio data and the video data are processed, the computing component of the guide device assigns a timestamp to the audio data and the video data using a common clock so that the audio data and the video data can be synchronized for presentation based on the timestamp. Likewise, if it is determined that an enhancement is to be presented with the video data, the timestamp may be used as a start indicator for the enhancement indicating a point in the video data at which presentation of the enhancement is to initiate.

A determination may also be made as to whether the video data and the audio data are to be synchronized during presentation by the user device, as in 904. In some implementations, the need for synchronization may be determined based on whether the audio data includes audio from a guide or other person or object speaking that is within the field of view of the imaging component of the guide device (i.e., represented in the video data). For example, the video data may be initially processed to determine if an individual is represented in the video data that is speaking. The image processing may be performed using one or more facial or feature recognition algorithms, human detection algorithms, or the like. Alternatively, or in addition thereto, if the guide device includes an array of microphones, approximate distance and direction to a sound's point of origin may be determined using, for example, acoustic localization based on time and amplitude differences between sounds captured by different microphones of the array. Such direction and distance information may be used to determine if a person or object speaking is within a field of view of the imaging component. In still other implementations, the guide may provide an input or indicator indicating when a person or other object within the field of view of the imaging component of the guide device is speaking such that the audio data and the video data are to be synchronized. For example, the guide may interact with the guide computing component by selecting a button or other input when a person or other object within the field of view of the imaging component is speaking, thereby indicating that the audio data and the video data are to be synchronized. In still other implementations, during a period of time while a user is interacting (e.g., speaking) with another person or object located within the destination location, it may be assumed that the person or other object are within the field of the view of the imaging component and the video data and audio data are to be synchronized. For example, if the user is interacting with a merchant located in the destination location, as discussed above with respect to FIG. 5, it may be assumed that the merchant is within the field of view of the imaging component and speaking to the user such that the audio data and the video data are to be synchronized.

Returning to FIG. 9, if it is determined that the audio data and the video data are to be synchronized when presented by the user device, a synchronization indicator is included with the transmission of the audio data and/or the video data, as in 906. Alternatively, a synchronization indicator may be transmitted separately to the user device. In such an example, the synchronization indicator may include a start synchronization timestamp indicating to the user device a timestamp associated with each of the audio data and the video data that is to be used to start a synchronization of the audio data and the video data. When synchronization of the audio data and the video data is no longer necessary, a subsequent synchronization indicator may be transmitted that includes a stop synchronization timestamp indicating to the user device a timestamp associated with each of the audio data and the video data that when reached synchronization may be terminated. In some implementations, the quality of the video data may be intentionally degraded during synchronization so that the video data can be processed, transmitted, and displayed faster on the user device.

If it is determined that the audio data and the video data do not need to be synchronized, the audio data and the video data are transmitted independently and no synchronization indicator or synchronization signal is provided with the audio data and/or the video data, or separately sent to the user device, as in 908.

When the user device receives audio data from the guide device a determination is made as to whether the audio data is to be synchronized with video data based on, for example, whether a synchronization indictor has been provided to the user device or included in the audio data. If no synchronization indicator is provided, the audio data is presented by the user device independent of the video data. Likewise, as the video data is received by the user device, the video data is presented concurrently with the audio data but not necessarily synchronized. In many instances, because the audio data may be general sounds and noises recorded by the guide device and are not directly related to the information included in the video data, the independent presentation of the audio data and video data is not disruptive to the user and provides the user with the highest quality and near real-time experience of the destination location.

In comparison, if the user device receives a synchronization indicator, the user device will buffer or otherwise store the audio data until video data with a corresponding timestamp is received. When the video data with a corresponding timestamp is received, the audio data and the video data are presented by the user device concurrently and synchronized. In either scenario, the user device may also present concurrently with the video data one or more enhancements to produce augmented video data.

Finally, after transmission of the video data and the audio data by the guide device, the example process 900 completes, as in 910.

As discussed above with respect to FIGS. 8A and 8B, if the video data and the audio data is being transmitted to multiple user devices, the example process 900 may be performed with respect to each of those user devices.

Figure 10:
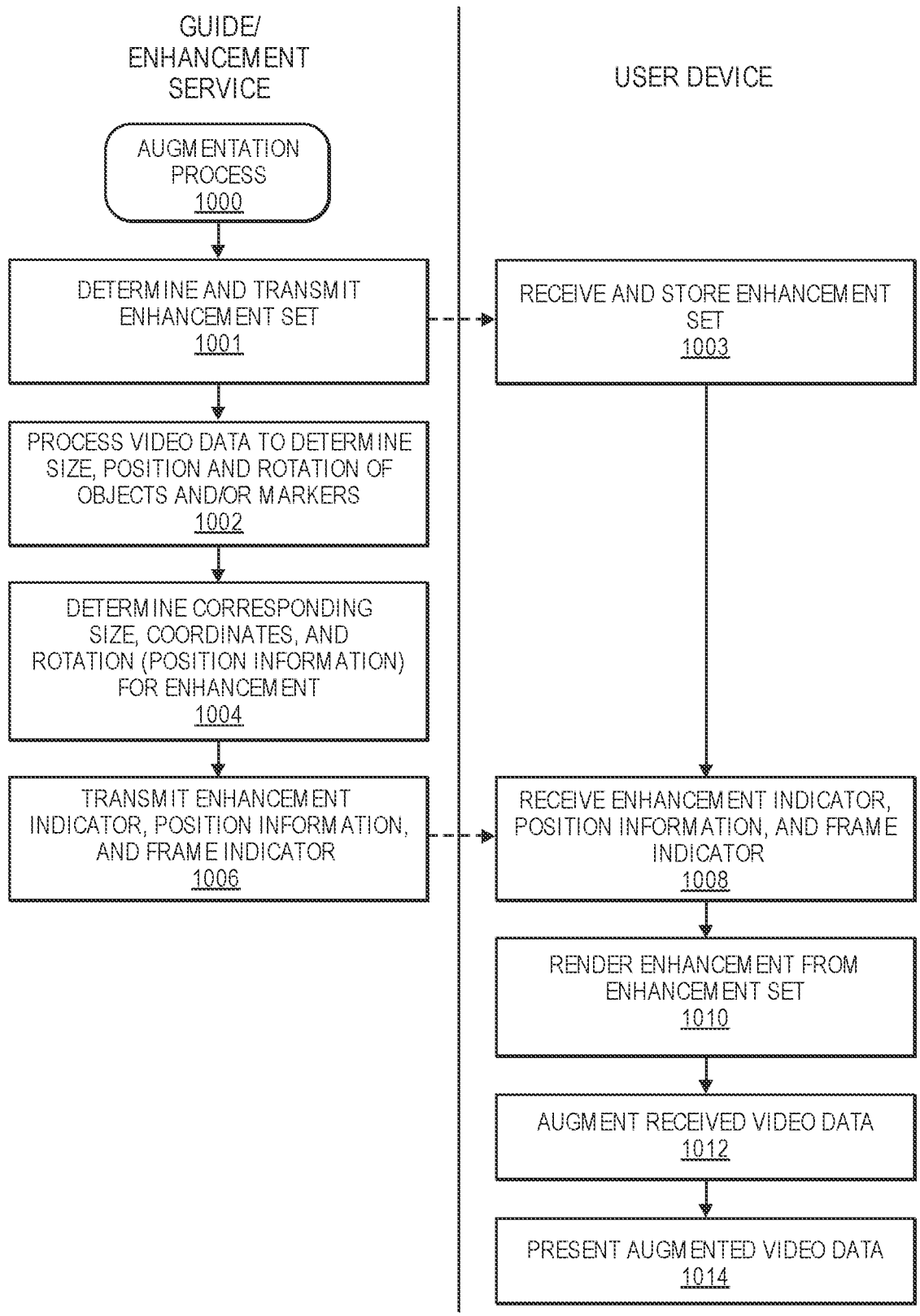
FIG. 10 illustrates an example augmentation process, according to an implementation.

FIG. 10 illustrates an example augmentation process 1000, according to an implementation. The example process 1000 may be performed when it is determined that a marker has been detected in the video data and that an enhancement is to be presented with the video data to produce augmented video data. An enhancement may be an audio enhancement, a video enhancement, a tactile enhancement, or any combination thereof. The enhancement may be presented concurrently with the video data and/or the audio data generated by the guide device.

As discussed above, a set of enhancements that relate to the environment (destination location), the user, the guide, etc. may be determined and the determined set of enhancements may be sent from the guide device and/or the enhancement service to the user device, as in 1001. The transmitted enhancement set is received by the user device and stored or cached in a memory of the user device, as in 1003. By transmitting the set of potential enhancements to the user device in advance of actually requesting a rendering and presentation of an enhancement, when an enhancement is to be presented, only an enhancement identifier needs to be transmitted to the user device. The user device may then utilize the enhancement identifier and the corresponding enhancement information stored as part of the enhancement set to render and present the requested enhancement.

If the enhancement includes video or other visual information that is to be presented with video data from the guide device, the video data from the guide device is processed to determine a size, position and rotation of one or more objects and/or markers within the video data, as in 1002. For example, one or more object detection algorithms, such as a SIFT algorithm may be used to determine a size, position, and relative shape or rotation of objects within the video data. The size, position and relative shape of the objects detected in the video data may be compared with stored size, position and shapes of known objects to determine a homography for the video data. Based on the homography, the perspective of the imaging component (orientation and translation) may be determined and position information for the enhancement that is to be presented with the video data is determined, as in 1004. For example, the position information for the enhancement may include a size, coordinates within the video data, and rotation or perspective from which the enhancement is to be rendered so that when the enhancement is rendered with the video data it is consistent with the video data presented to the user. Returning to the example of the Pike Place Fish Market, if the enhancement includes a worker at the fish market throwing fish, the position information indicates a size, position, and perspective for rendering and presenting the worker and the thrown fish so that the enhancement is similar in size to the objects in the video data and appears visually consistent with the video data.

In addition to determining position information for the enhancement, a frame or other indicator indicating where in the video data presentation the enhancement is to be initiated is also determined. The frame indicator may be, for example, a key frame of the video data in which a marker is first detected.

Upon determining the position information for the enhancement, an enhancement indicator, the enhancement position information, and a frame indicator of the video data is transmitted to the user device, as in 1006. Steps 1002-1006 may be performed by an enhancement service operating on the guide device as video data is generated by the imaging component of the guide device and provided to the enhancement service operating on the guide device and the enhancement service of the guide device may transmit the enhancement indicator, position information, and frame indicator to the user device and/or to the remote computing device. In other implementations, the video data may be transmitted from the guide device to the enhancement service operating on remote computing systems and all of the processing may by performed by the enhancement service operating on the remote computing systems and the enhancement service operating on the remote computing systems may send to the user device the enhancement indicator, position information and key frame indicator. In still other examples, some initial processing, such as processing of the video data to determine if a marker is present, may be performed an enhancement service operating on the guide device and some of the processing, such as determining position information for an enhancement may be performed by the enhancement service operating on the remote computing systems. Likewise, while the example process 1000 illustrates that the enhancement is rendered by an enhancement service operating on user device and presented with the video data to produce augmented video data, in other implementations, the enhancement may be rendered by an enhancement service operating on guide device and/or the enhancement service operating on the remote computing systems, included in the video data to produce augmented video data and the augmented video data sent to the user device for presentation. In such an example, the user device does not need to render the enhancement and present both the video data and the enhancement data. Instead, the user device may simply present the received video data.

In implementations in which the user device is rendering the enhancement, enhancement information for candidate enhancements may be pre-stored or cached in a memory of the user device. In such an implementation, an enhancement indicator, position information for the enhancement, and a frame indictor indicating a point within the video data at which the enhancement is to be presented is received by the user device, as in 1008. The user device, upon receiving the position information and the enhancement indictor, can utilize the enhancement information stored in a memory of the user device to render the enhancement based on the received position information, as in 1010.

Utilizing the rendered enhancement and the frame indicator, the video data received from the guide device is augmented to include the enhancement, as in 1012, and the augmented video data is presented by the user device, as in 1014. In some implementations, the video data may be augmented with the enhancement and the augmented video data presented by the user device. In other implementations, the video data may be presented by the user device and the enhancement may be presented with the video data to produce the augmented video data.

As discussed above, video data may be augmented with one or more enhancements at the guide device, by the enhancement service operating on remote computing resources, or on the user device, and the implementation discussed with respect to FIG. 10 is provided only as an example implementation. As another example, an enhancement service operating on the guide device may process the video data to detect a marker in the video data. Upon detection of a marker, the video data may be provided to the enhancement service operating on the remote computing system. The enhancement service operating on the remote computing systems may further process the video data to determine position information for the enhancement, render the enhancement based on enhancement information maintained in a data store accessible to the enhancement service, and produce augmented video data that includes both the video data from the guide device and the enhancement. The augmented video data may then be sent to the user device for presentation to the user.

In still another example, the guide device generates the video data and provides the video data directly to the enhancement service operating on the remote computing systems without any processing. The enhancement service operating on the remote computing systems may process the video data to detect a marker. Upon detection of a marker, the enhancement service may further process the video data to determine position information for the enhancement, render the enhancement based on enhancement information maintained in a data store accessible to the enhancement service, and produce augmented video data that includes both the video data from the guide device and the enhancement. The augmented video data may then be sent to the user device for presentation to the user.

In still another example, the guide device may generate the video data and an enhancement service operating on the guide device may process the video data to detect a marker. Upon detection of a marker, the enhancement service operating on the guide device may further process the video data to determine position information for the enhancement, render the enhancement based on enhancement information maintained in a data store accessible to the guide device, and produce augmented video data that includes both the generated video data and the enhancement. The augmented video data may then be sent to the user device for presentation to the user and/or sent to the remote computing systems.

In yet another example, the guide device may generate the video data and send the video data to the user device without further processing. An enhancement service operating on the user device may process the video data to detect a marker. Upon detection of a marker, the enhancement service operating on the user device may further process the video data to determine position information for the enhancement, render the enhancement based on enhancement information maintained in a data store accessible to the user device, and produce augmented video data that includes both the generated video data and the enhancement. The augmented video data may then be presented by the user device.

As discussed above with respect to FIGS. 8A and 8B, if the video data and the audio data is being transmitted to multiple user devices, the example process 1000 may be performed with respect to each of those user devices.

Figure 11:
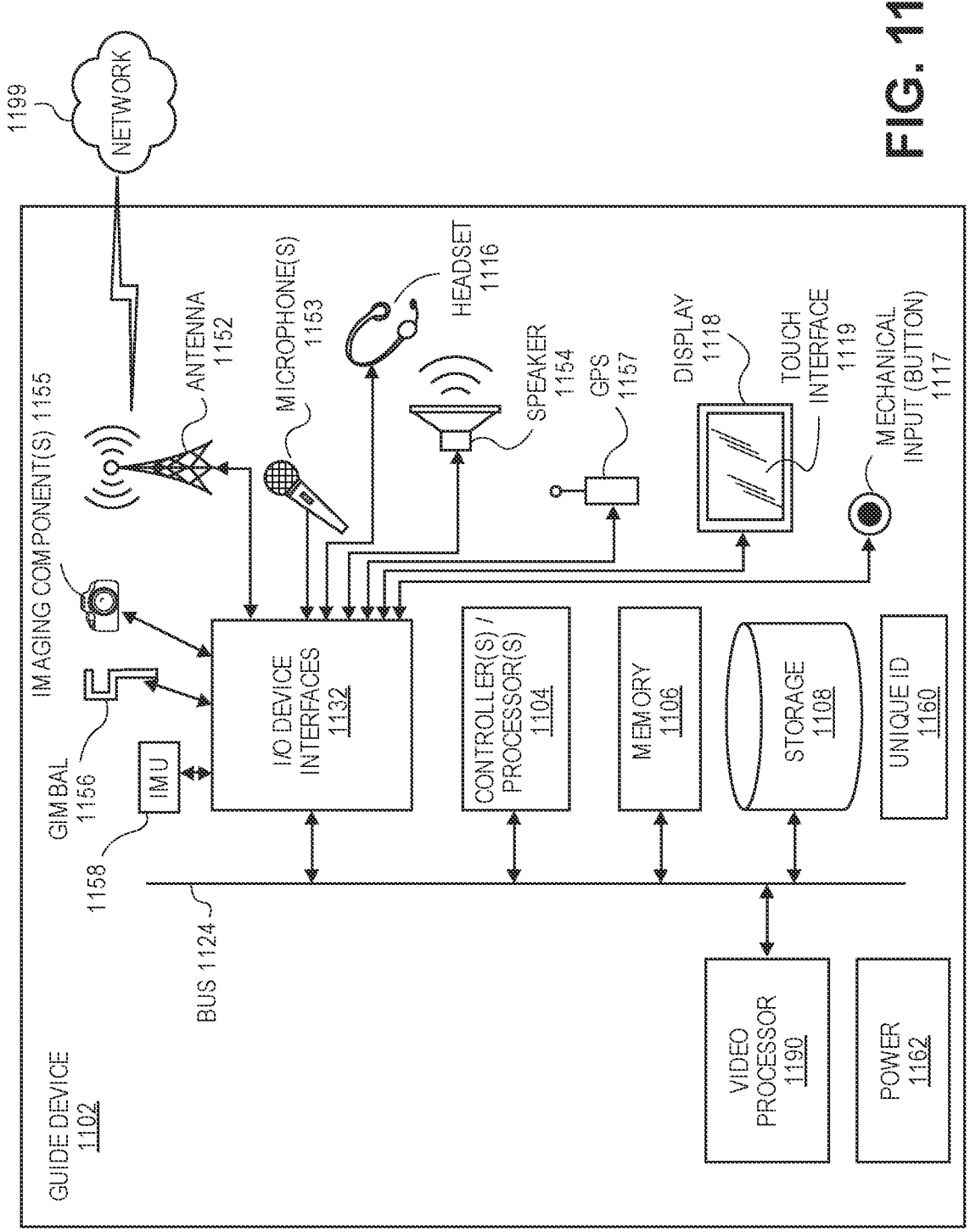
FIG. 11 illustrates an example guide device, according to an implementation.
Figure 12:
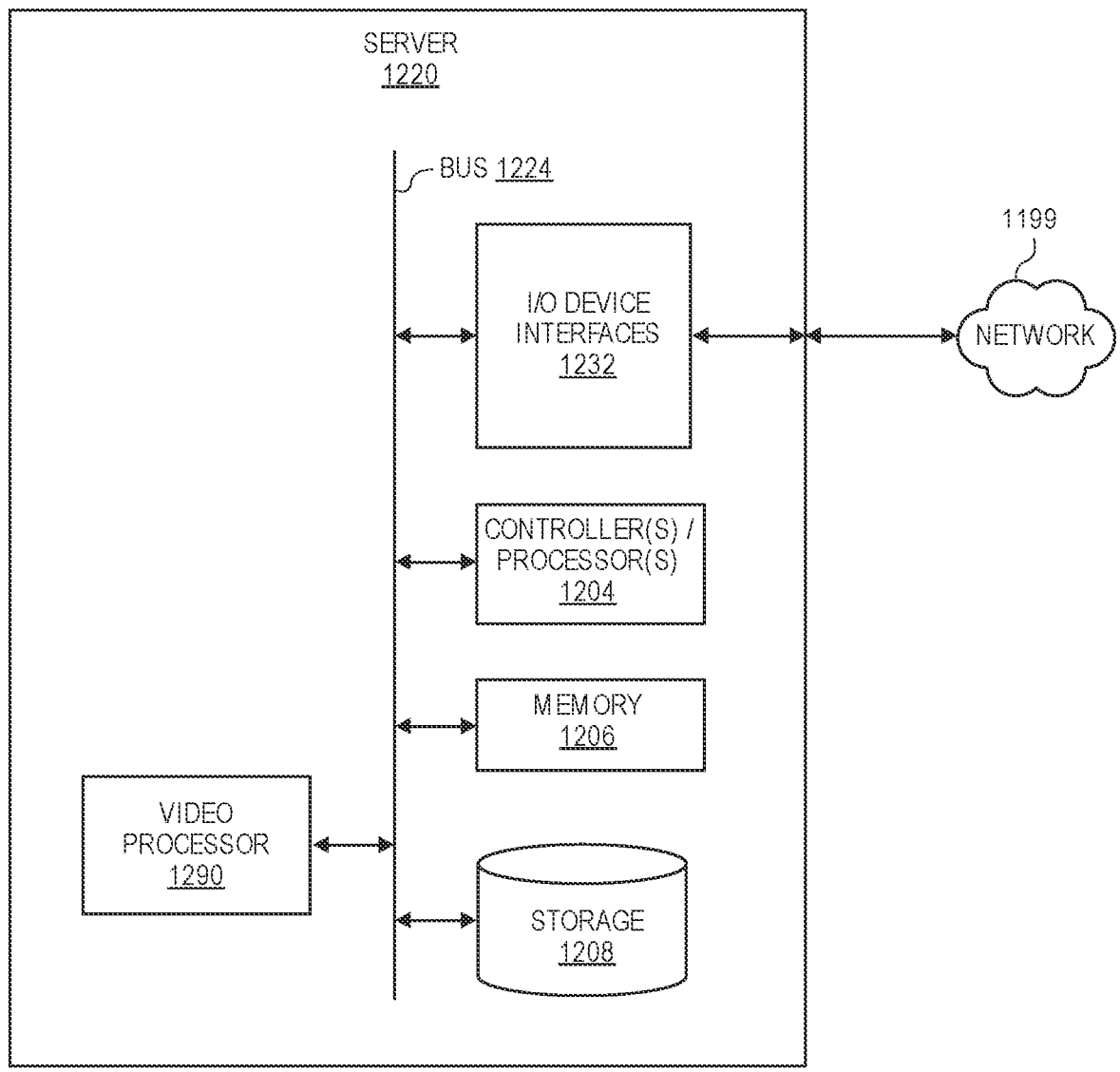
FIG. 12 illustrates example components of a server, according to an implementation.

FIG. 11 is a block diagram conceptually illustrating a guide device 1102 that may be used with the described system. FIG. 12 is a block diagram conceptually illustrating example components of a remote device, such as a remote server 1220 that may assist with processing, detecting markers in video data, rendering enhancements, generating augmented video data, and the like. Multiple such servers 1220 may be included in the system, such as one server(s) 1220 for marker detection in video data, one server(s) for processing the video data to generate a homography for use in determining position information for the enhancement to be rendered, one server(s) 1220 for rendering the enhancement and generating augmented video data, etc. In operation, each of these devices (or groups of devices) may include computer-readable and computer-executable instructions that reside on the respective device (1102/1220), as will be discussed further below.

Each of these devices (1102/1220) may include one or more controllers/processors (1104/1204), that may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive (MRAM) and/or other types of memory. Each device may also include a data storage component (1108/1208), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1132/1232).

Computer instructions for operating each device (1102/1220) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (1102/1220) includes input/output device interfaces (1132/1232). A variety of components may be connected through the input/output device interfaces, as will be discussed further below. Additionally, each device (1102/1220) may include an address/data bus (1124/1224) for conveying data among components of the respective device. Each component within a device (1102/1220) may also be directly connected to other components in addition to (or instead of) being connected to other components across the bus (1124/1224).

Referring to the guide device 1102 of FIG. 11, the device 1102 may include a display 1118, which may comprise a touch interface 1119. Alternatively, the device 1102 may be "headless" and may primarily rely on spoken commands and/or mechanical inputs (e.g. buttons) for input. For example, as a way of indicating by a guide that a person or other object within a field of view of the imaging component of the guide device 1102 is speaking, the guide may provide an indication through a mechanical input 1117, such as a mechanical button. As another example, to provide feedback to the guide that a user is interacting with an enhancement and/or that an enhancement is being presented to the user, audible feedback may be output through a speaker 1154 and/or through the headset 1116 that may be worn by the guide and include a speaker and microphone.

The device 1102 also includes an imaging component 1155, such as a digital video camera, which may be mounted to the guide, mounted on a gimbal 1156 that is held by the guide, etc. The gimbal 1156 may be coupled to the input/output device interface 1132 and be configured to receive commands from a user that cause the gimbal to rotate or otherwise change the orientation of the field of view of the imaging component 1155. Likewise, the imaging component 1155 may receive through the input/output interface 1132 commands to generate digital images, alter the zoom of the imaging component 1155, etc. Likewise, the imaging component 1155 provides video data and/or generated digital images through the input/output interface 1132 for transmission to the user device and/or the enhancement service, as discussed above. In general, the input/output interfaces 1132 between the gimbal 1156 and the imaging component 1155 provide a user at any location that is communicating with the guide and the guide device 1102 the ability to control the field of view of the imaging component 1155 and selectively determine the content of the destination location presented to the user.

The guide device 1102 may also include input/output device interfaces 1132 that connect to a variety of other components such as an audio output component, such as a speaker 1154, a wired headset or a wireless headset 1116, and/or other components capable of outputting audio. The audio capture component may be, for example, a microphone 1153 or array of microphones, a wired headset or a wireless headset, etc. The microphone 1153 may be configured to capture audio, such as sounds within the destination location and/or other people or objects within the destination location talking. If an array of microphones is included, approximate distance and direction to a sound's point of origin may be determined using, for example, acoustic localization based on time and amplitude differences between sounds captured by different microphones of the array. Such direction and distance information may be used to determine if a person or object speaking is within a field of view of the imaging component to determine whether presented audio data and video data at the user device needs to be synchronized.

The guide device also includes one or more antennas 1152 that connect to one or more networks 1199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, etc. Through the network(s) 1199, audio data, video data, enhancement information, etc. may be transmitted to the enhancement service and/or to the user device for presentation by the user device to a user that is communicating with the guide and controlling components of the guide device 1102.

The guide device 1102 may also include a location component, such as a GPS 1157, an indoor positioning system, or other location based component. Likewise, in some implementations, the guide device 1102 and/or the server 1220 may include one or more video processors 1190/1290 that are configured to process video data generated by the imagining component 1155 of the guide device 1102. As discussed above, the video processors 1190/1290 may process the video data to determine if a maker is present in the video data, to determine position information for enhancements to present with the video data to produce augmented video data, to render enhancements, and/or to generate augmented video data that includes the video data and the enhancements.

The guide device may also include one or more inertial measurement units (IMU) 1158. As is known in the art, an IMU may include an accelerometer, a gyroscope, and/or a compass and provide position information based on the accelerometer, gyroscope and/or compass. In some implementations, an IMU 1158 may be included in the gimbal 1156 and provide position information indicating an orientation of the imaging component 1155 mounted to the gimbal. As another example, an IMU 1158 may be included on the imaging component 1155 and position information may be provided to indicate a position or orientation of the imaging component 1155. In still another example, an IMU 1158 may be included on the guide themselves and position information may be provided to indicate a position or orientation of the guide.

Multiple guide devices may be employed in a single system and different users may connect with, communicate with and control different guide devices. As such, each guide device may also include a unique identifier 1160. The unique identifier may be any form of unique identification and may be included in video data and/or audio data that is transmitted from the guide device. Likewise, a user device and/or the enhancement service may utilize the unique identifier to enable communication and/or control with the guide device. In such a multi-device system, each of the guide devices may include the same or different components. The components of the guide device 1102 and the server 1220, as illustrated in FIGS. 11 and 12, are exemplary, and should not be considered limiting to the implementations discussed herein.

The concepts disclosed herein may be applied within a number of different devices and computer systems, including, for example, general-purpose computing systems, video processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, video processing, and augmented reality should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "near," "nearly" or "substantially" as used herein, represent a value, amount, or characteristic close to the stated value, amount, or characteristic that still performs a desired function or achieves a desired result. For example, the terms "about," "approximately," "generally," "near," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
receiving, from an imaging component of a guide device, video data representative of an environment, the video data including a first timestamp;
receiving, from an audio component of the guide device, audio data associated with the environment, the audio data including a second timestamp;
determining an enhancement to be used to augment the video data as the video data is presented by a user device, the enhancement including a third timestamp;
determining that the video data, the audio data, and the enhancement are to be synchronized during presentation by the user device;
transmitting, to the user device, a synchronization indicator for the video data, the audio data, and the enhancement, the synchronization indicator including a start synchronization timestamp; and
causing synchronization of the video data, the audio data, and the enhancement during presentation by the user device based at least in part on the start synchronization timestamp, the first timestamp, the second timestamp, and the third timestamp.

2. The computer-implemented method of claim 1, wherein the video data and the audio data are caused to be synchronized during presentation by the user device in response to the first timestamp and the second timestamp being later in time than the start synchronization timestamp.

3. The computer-implemented method of claim 2, wherein the first timestamp and the second timestamp are associated with a same time.

4. The computer-implemented method of claim 1, wherein the video data and the enhancement are caused to be synchronized during presentation by the user device in response to the first timestamp and the third timestamp being later in time than the start synchronization timestamp.

5. The computer-implemented method of claim 1, further comprising:
transmitting, to the user device, a subsequent synchronization indicator, the subsequent synchronization indicator including a stop synchronization timestamp; and
causing stopping of synchronization of the video data, the audio data, and the enhancement during presentation by the user device based at least in part on the stop synchronization timestamp.

6. A synchronization service, comprising:
one or more processors; and
a memory coupled to the one or more processors and storing program instructions that when executed by the one or more processors cause the one or more processors to at least:
receive, from an imaging component of a guide device, video data representative of an environment, the video data including a first timestamp;
receive, from an audio component of the guide device, audio data associated with the environment, the audio data including a second timestamp;
determine that the video data and the audio data are to be synchronized during presentation by a user device;
transmit, to the user device, a synchronization indicator for the video data and the audio data, the synchronization indicator including a start synchronization timestamp; and
cause synchronization of the video data and the audio data during presentation by the user device based at least in part on the start synchronization timestamp, the first timestamp, and the second timestamp.

7. The synchronization service of claim 6, wherein determining that the video data and the audio data are to be synchronized further comprises:
processing the video data to determine that a source of the audio data is within a field of view of the imaging component and is represented in the video data.

8. The synchronization service of claim 6, wherein determining that the video data and the audio data are to be synchronized further comprises:
processing the audio data to localize a source of the audio data, wherein the audio component comprises an array of microphones; and
determining that the source of the audio data is within a field of view of the imaging component and is represented in the video data.

9. The synchronization service of claim 6, wherein determining that the video data and the audio data are to be synchronized further comprises:
receiving, from an input element of the guide device, an indication that the video data and the audio data are to be synchronized.

10. The synchronization service of claim 6, wherein determining that the video data and the audio data are to be synchronized further comprises:

receiving, from an audio component of the user device, audio data associated with a user of the user device; and
determining that the user of the user device is interacting with a source of the audio data associated with the environment.

11. The synchronization service of claim 6, wherein the synchronization indicator is transmitted at least one of together with or separately from the video data and the audio data.

12. The synchronization service of claim 6, wherein the program instructions further cause the one or more processors to at least:
at least one of buffer or delay the audio data to cause synchronization of the video data and the audio data.

13. The synchronization service of claim 6, wherein the program instructions further cause the one or more processors to at least:
reduce a quality of the video data to cause synchronization of the video data and the audio data.

14. The synchronization service of claim 6, wherein the program instructions further cause the one or more processors to at least:
initiate synchronization of the video data and the audio data during presentation by the user device at respective timestamps at or after the start synchronization timestamp.

15. The synchronization service of claim 6, wherein the program instructions further cause the one or more processors to at least:
transmit, to the user device, a subsequent synchronization indicator, the subsequent synchronization indicator including a stop synchronization timestamp; and
cause stopping of synchronization of the video data and the audio data during presentation by the user device based at least in part on the stop synchronization timestamp.

16. A computer-implemented method, comprising:
receiving, by a user device, video data representative of an environment, the video data captured by an imaging component of a guide device, and the video data including a first timestamp;
receiving, by the user device, audio data associated with the environment, the audio data captured by an audio component of the guide device, and the audio data including a second timestamp;
receiving, by the user device, a synchronization indicator for the video data and the audio data, the synchronization indicator including a start synchronization timestamp; and
causing, during presentation by the user device, synchronization of the video data and the audio data based at least in part on the start synchronization timestamp, the first timestamp, and the second timestamp.

17. The computer-implemented method of claim 16, further comprising:
at least one of buffering or delaying, by the user device, the audio data to cause synchronization of the video data and the audio data.

18. The computer-implemented method of claim 16, further comprising:
reducing, by the user device, a quality of the video data to cause synchronization of the video data and the audio data.

19. The computer-implemented method of claim 16, further comprising:
- receiving, by the user device, an enhancement to be used to augment the video data as the video data is presented by the user device, the enhancement including a third timestamp; and
- causing, during presentation by the user device, synchronization of the enhancement and the video data based at least in part on the start synchronization timestamp, the first timestamp, and the third timestamp.

20. The computer-implemented method of claim 16, further comprising:
- receiving, by the user device, a subsequent synchronization indicator, the subsequent synchronization indicator including a stop synchronization timestamp; and
- causing, during presentation by the user device, stopping of synchronization of the video data and the audio data based at least in part on the stop synchronization timestamp.

\* \* \* \* \*